United States Patent
Omar

(10) Patent No.: US 8,976,703 B2
(45) Date of Patent: *Mar. 10, 2015

(54) PERFORMANCE MONITORING-BASED NETWORK RESOURCE MANAGEMENT WITH MOBILITY SUPPORT

(71) Applicant: Verizon Patent and Licensing, Inc., Basking Ridge, NJ (US)

(72) Inventor: Hassan M. Omar, Mt. Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,383

(22) Filed: Dec. 9, 2013

(65) Prior Publication Data

US 2014/0094172 A1    Apr. 3, 2014

Related U.S. Application Data

(63) Continuation of application No. 12/544,350, filed on Aug. 20, 2009, now Pat. No. 8,619,621.

(51) Int. Cl.
*H04W 36/30* (2009.01)
*H04W 60/04* (2009.01)
*H04W 24/10* (2009.01)

(52) U.S. Cl.
CPC .............. *H04W 36/30* (2013.01); *H04W 60/04* (2013.01); *H04W 24/10* (2013.01)
USPC ............................ 370/253; 370/329; 455/436

(58) Field of Classification Search
CPC ....................... H04W 28/0231; H04W 72/1226
See application file for complete search history.

*Primary Examiner* — Jianye Wu

(57) ABSTRACT

A device receives, from a mobile device, a registration request when the mobile device moves to a new service area of a network, where the registration request includes a resource management (RM) extension and a performance monitoring (PM) extension. The device also inspects quality of service requirements of the registration request, identifies performance aspects of the registration request to be verified, and inspects performance monitoring information associated with the registration request to identify a performance monitoring test needed to make a resource management decision. The device further executes the performance monitoring test, collects results of the execution of the performance monitoring test, analyzes the collected results of the performance monitoring test, determines whether intervention related to network topology and configuration is possible, and accepts or rejects the registration request based on the analysis of the collected results of the performance monitoring test.

20 Claims, 16 Drawing Sheets

FIG. 6

| ALLOCATION EXTENSION TYPE 600 | ALLOCATION EXTENSION LENGTH 610 | ALLOCATION EXTENSION SUB-TYPE 620 | ALLOCATION EXTENSION DATA 630 |
|---|---|---|---|

FIG. 7

| PERFORMANCE MONITORING EXTENSION TYPE 700 | PERFORMANCE MONITORING EXTENSION LENGTH 710 | PERFORMANCE MONITORING EXTENSION SUB-TYPE 720 | PERFORMANCE MONITORING EXTENSION DATA 730 |
|---|---|---|---|

510

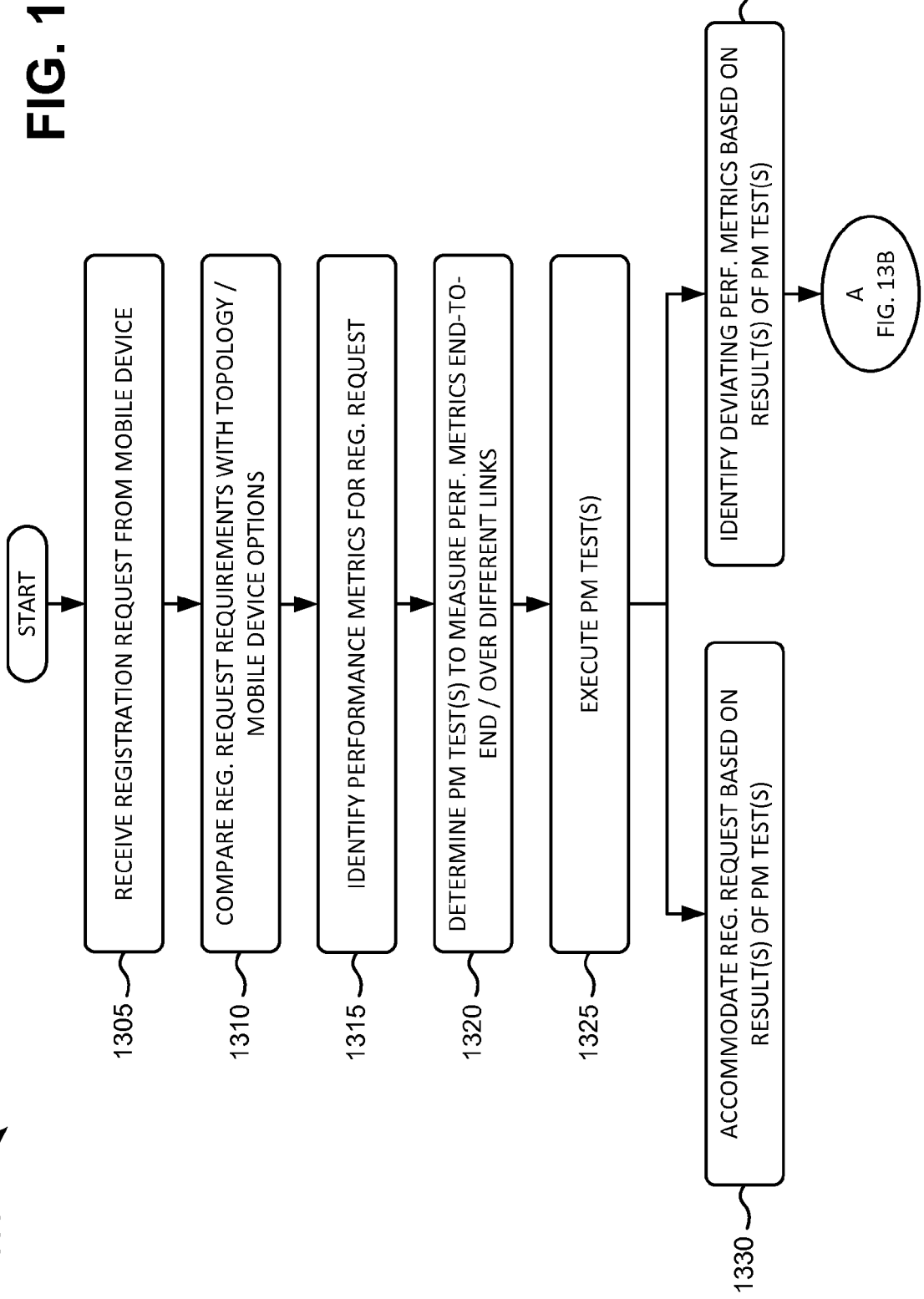

PERFORMANCE MONITORING-BASED NETWORK RESOURCE MANAGEMENT WITH MOBILITY SUPPORT

CROSS REFERENCE TO RELATED APPLICATIONS

This application is a continuation of U.S. patent application Ser. No. 12/544,350 filed on Aug. 20, 2009, the disclosure of which is incorporated herein by reference in its entirety.

BACKGROUND

Network resource management addresses the need for ensuring that a particular network has appropriate resources to provide a customer with an intended quality of service. Current networks support different types of applications with different requirements. Some applications require very strict commitment regarding resource availability for some or all of corresponding traffic components. For example, services supporting applications that use audio and video components, along with mission critical tasks, particularly need a reliable system that ensures compliance with a service level agreement. An efficient network resource management system optimizes allocation of network resources by managing different aspects of a network (e.g., configuration of queuing, traffic scheduling, traffic coloring, path selection, path manipulation, etc.) to satisfy a maximum number of service requests while optimizing utilization of the network. User mobility (e.g., via mobile communication devices or mobile devices) imposes additional challenges to network resource management systems. For example, a variable link quality associated with wireless access technologies and a possibility of using ad-hoc connections add complexity to the resource management problem. Current networks utilize a variety of queuing and scheduling schemes, such that network performance metrics are likely to be unique for each traffic stream.

Network protocols that support mobility aim at ensuring appropriate forwarding of packets as a mobile device changes its network attachment point and/or technology used to gain access to the network. To ensure that an acceptable quality of experience is observed by the mobile device, and considering different available applications, each traffic component requires appropriate treatment per a corresponding class of service. For a typical mobile device, application traffic is carried over multiple networks. Appropriate treatment is required on each network element along a path on which traffic will be forwarded. Mobile-IP (Internet protocol) allows mobile devices to continue receiving datagrams (e.g., any type or form of data, such as packet or non-packet data) wherever the mobile devices are attached to the Internet. Mobile-IP enables the mobile devices (also known as IP hosts, mobile hosts, or mobile nodes) to move between different sub-networks without tearing down established transport layer sessions. The mobility of the mobile devices is supported by two agents, a home agent (HA) and a foreign agent (FA). An element that is communicating with a mobile device is referred to as a correspondent node (CN). However, an environment supporting mobility and differentiated treatment presents significant challenges for network resource management systems.

To function in an optimized fashion, a network resource management system requires access to accurate information regarding current values of performance-related metrics, such as delay, packet loss, jitter, etc. Such performance metric values may differ over multiple network segments and over short periods of time. In addition, current wireless technologies may present a user with multiple options (e.g., each with different characteristics and performance aspects) to gain access to a provider network. A network resource management system needs visibility into the performance metrics when each of those options is considered.

However, current network resource management systems either do not consider current performance aspects or rely on non-integrated performance monitoring systems to provide such information, which creates interfacing and interoperability issues. Current performance monitoring systems generate and receive test packets between two or more pre-identified elements, and evaluate performance metrics based on results across those elements. Such performance monitoring systems are typically standalone, are not designed to support mobile environments, and are incapable of identifying a root cause of performance issues which are triggered by mobility-related events in a mobile environment. Thus, performance aspects that are affected by mobility events can get misinterpreted by such systems. Without visibility into protocols and states associated with a mobile environment, current network resource management systems fail to optimize a provided service and network utilization.

BRIEF DESCRIPTION OF THE DRAWINGS

FIG. 6 illustrates a diagram of an exemplary format of an allocation extension of a registration request;

FIG. 7 depicts a diagram of an exemplary format of a performance monitoring extension of a registration request;

FIGS. 13A and 13B depict a flow chart of an exemplary process for optimizing network performance based on performance monitoring results according to implementations described herein.

DETAILED DESCRIPTION OF PREFERRED EMBODIMENTS

Figure 1:
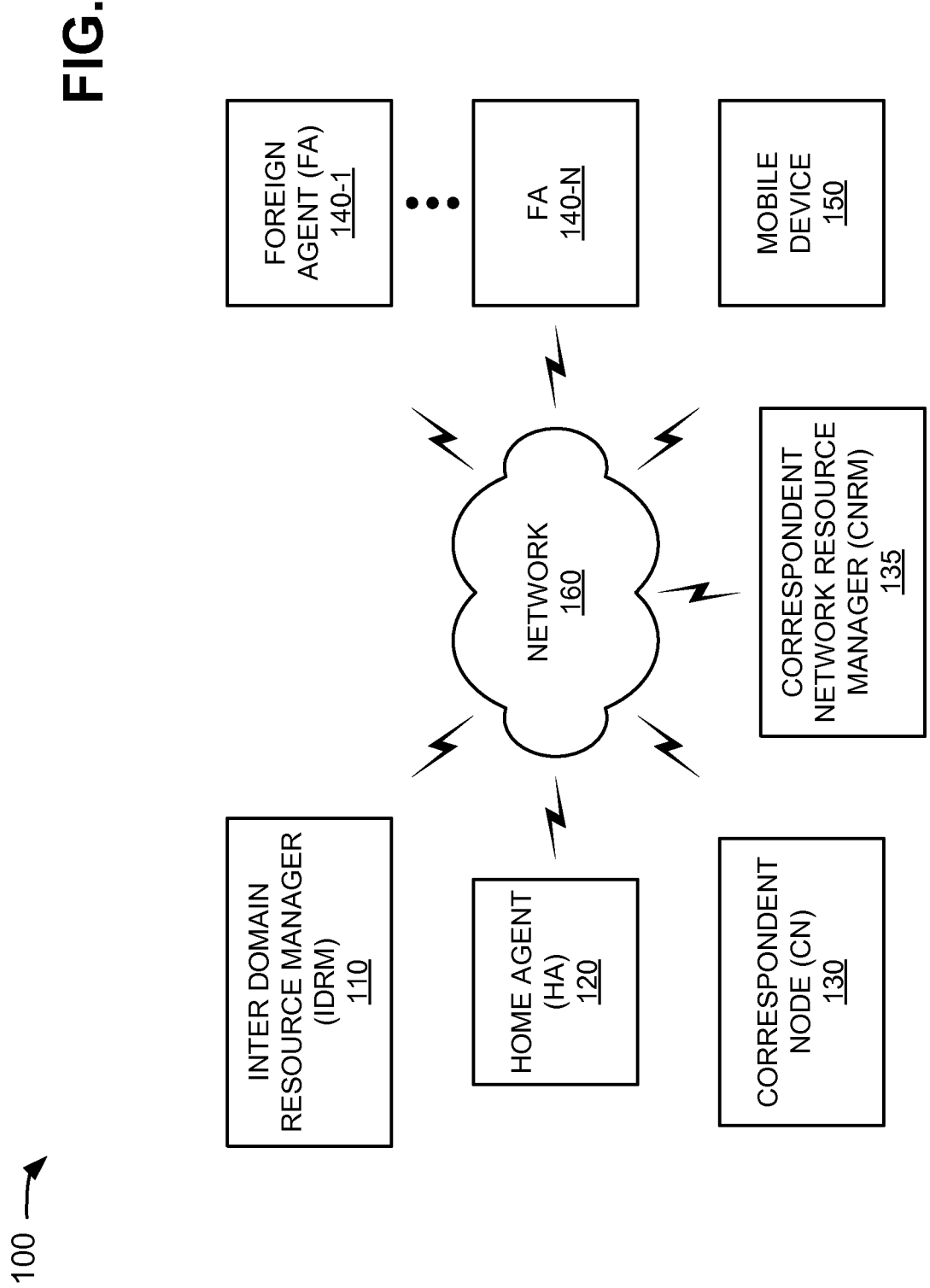
FIG. 1 depicts a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Implementations described herein may provide systems and/or methods that may manage network resources and policies based on monitored performance aspects in a network that supports mobile devices. The systems and/or methods may collect and/or analyze performance metrics of different aspects over different segments of the network. The systems and/or methods may use the resulting analysis to support a network resource management system. The systems and/or method may react to mobility- and/or capacity-related network events while actively evaluating and monitoring relevant network performance aspects. The systems and/or methods may integrate both performance monitoring and resource management in a manner that optimizes network utilization and service availability. The integrated performance monitoring and resource management functions may provide a more accurate network resource manager that is efficient for a mobile environment.

In one exemplary implementation, the systems and/or methods may trigger performance evaluation test sessions on-demand and with fine-tuned parameters (e.g., tailored to support the network resource management function, and taking into consideration both mobile device and network configurations). The systems and/or methods may provide visibility into mobility events and protocols, which may enable accurate interpretation of root causes of performance issues and may prevent inaccurate resource management and/or unnecessary traffic engineering decisions. The systems and/or methods may arrange performance monitoring sessions (e.g., on demand and in an optimized manner) so that they address an area relevant to network resource allocation for a particular request, while avoiding introduction of unnecessary overhead to network traffic. The systems and/or methods may verify resources before accepting a new performance monitoring session, and may provide continuous verification during a life of a communication session. Further, the systems and/or methods may influence decisions related to a number of aspects, such as routing, technology selection, selection of a number of interfaces to be used by a mobile device, and selection of a next service area to achieve a particular performance.

Although the systems and/or methods are described in connection with the Mobile-IP protocol and the Mobile IPv4 (version 4) regional registration environment, in other implementations, the systems and/or methods may be utilized with other protocols supporting either mobile devices, stationary devices, or both mobile and stationary devices.

Service providers may utilize systems and/or methods described herein to offer and maintain differentiated services. In particular, the systems and/or methods may permit a service provider to offer an efficient resource management solution capable of supporting dynamic environments. Service providers interested in sending and receiving sensitive traffic with an optimal performance available at any instant of time may benefit from the systems and/or methods. For service providers with strict requirements regarding performance, the systems and/or methods may ensure that their resources are allocated and continuously tracked using tailored performance monitoring tests. Further, results obtained from the performance monitoring tests may allow the service providers to provide proof of performance of a provided service.

Service providers offering services where performance is relevant (e.g., voice-over-IP (VoIP), video-on-demand (VoD), video-IP, IP-based television, Internet access, virtual private network (VPN), etc.) may take advantage of the systems and/or methods. The systems and/or methods may also support functions (e.g., dynamic traffic engineering) that permit service providers to optimize efficiency and maximize profit via intelligent usage of available resources.

The systems and/or methods described herein may be implemented on existing network elements (e.g., elements supporting mobility, routing, forwarding elements, policy and resource management, etc.). Such network elements may be considered more attractive and more efficient to support services where resource allocation and quality of service features may be utilized. The systems and/or methods described herein may also be implemented as a software module on top of generic hardware (e.g., as a standalone product).

As used herein, the term "user" is intended to be broadly interpreted to include a mobile device or a user of a mobile device.

FIG. 1 is a diagram of an exemplary network 100 in which systems and/or methods described herein may be implemented. As illustrated, network 100 may include a IDRM 110, a HA 120, a CN 130, a CNRM 135, one or more FAs 140-1, . . . , 140-N (referred to collectively as "FAs 140" and singularly as "FA 140"), and a mobile device 150 interconnected by a network 160. Components of network 100 may interconnect via wired and/or wireless connections. A single IDRM 110, HA 120, CN 130, CNRM 135, mobile device 150, and network 160 have been illustrated in FIG. 1 for simplicity. In practice, there may be more IDRMs 110, HAs 120, CNs 130, CNRMs 135, mobile devices 150, and/or networks 160. Furthermore, there may be more or fewer FAs 140 than depicted in FIG. 1. Also, in some instances, one or more of the components of network 100 may perform one or more functions described as being performed by another one or more of the components of network 100. In one exemplary implementation, network 100 may include a network that supports the Mobile-IP protocol and a Mobile IPv4 (version 4) or IPv6 (version 6) regional registration environment.

IDRM 110 may include one or more data transfer devices, server entities, or other types of computation or communication devices, that gather, process, search, and/or provide information in a manner described herein. In one implementation, IDRM 110 may manage resources between domains, may interact with other resource managers, and may allocate network resources within the Internet. For example, IDRM 110 may allocate resources between a home network (e.g., HA 120) and a gateway FA (GFA) (e.g., a device that supports Internet traffic forwarding for a mobile device connecting to the Internet from any location other than its home network).

HA 120 may include one or more data transfer devices, server entities, or other types of computation or communication devices, that gather, process, search, and/or provide information in a manner described herein. In one implementation, HA 120 may include a device (e.g., a data transfer device, such as a gateway, a router, a switch, a firewall, a network interface card (NIC), a hub, a bridge, a proxy server, or some other type of device that processes and/or transfers data) on a mobile device's (e.g., mobile device 150) home network that maintains information about the mobile device's current location (e.g., as identified in its care-of address or current point of attachment). HA 120 may use tunneling mechanisms to forward Internet traffic so that the mobile device's IP address does not have to be changed each time the mobile device connects from a different location. HA 120 may work in conjunction with one or more FAs 140 (e.g., a device on a visited network).

CN 130 may include one or more data transfer devices, server entities, or other types of computation or communication devices, that gather, process, search, and/or provide information in a manner described herein. In one implementation, CN 130 may communicate and/or correspond with a mobile node (e.g., mobile device 150). For example, CN 130 may send data to mobile device 150 mobile device 150's home address. HA 120 may intercept the data and may tunnel the data to mobile device 150's current care-of address. Mobile device 150 may send data to CN 130 through HA 120.

CNRM 135 may include one or more data transfer devices, server entities, or other types of computation or communication devices, that gather, process, search, and/or provide information in a manner described herein. In one implementation, CNRM 135 may allocate resources between a correspondent node network (e.g., a network of mobile or non-mobile nodes that communicate with a mobile device) and another point of network 100. In one exemplary implementation, CNRM 135 may be omitted and the functions of CNRM 135 may be performed by IDRM 110 (e.g., with appropriate connectivity and authorization).

FA 140 may include one or more data transfer devices, server entities, or other types of computation or communication devices, that gather, process, search, and/or provide information in a manner described herein. In one implementation, FA 140 may include a device (e.g., a data transfer device, such as a gateway, a router, a switch, a firewall, a NIC, a hub, a bridge, a proxy server, or some other type of device that processes and/or transfers data) that stores information about mobile nodes (e.g., mobile device 150) visiting FA 140's network. FA 140 may advertise care-of-addresses (e.g., physical IP addresses of mobile devices operating in a foreign network) that may be used by mobile device 150. In one exemplary implementation, one or more of FAs 140 may be a gateway FA (GFA). A GFA may include a FA with a publicly routable IP address, and may, for example, be provided in or near a firewall.

Mobile device 150 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), a router, or other types of mobile communication devices. In one implementation, mobile device 150 may include any device (e.g., an IP-based device) that enables a user to access the Internet via network 160. In one example, mobile device 150 may include an Internet-connected device (e.g., a "mobile node" or "mobile host") whose location and point of attachment to the Internet may frequently change.

Network 160 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. In one exemplary implementation, network 160 may include a network that supports the Mobile-IP protocol and a Mobile IPv4 (version 4) or IPv6 (version 6) regional registration environment.

Although FIG. 1 shows exemplary components of network 100, in other implementations, network 100 may contain fewer, different, differently arranged, or additional components than depicted in FIG. 1.

Figure 2:
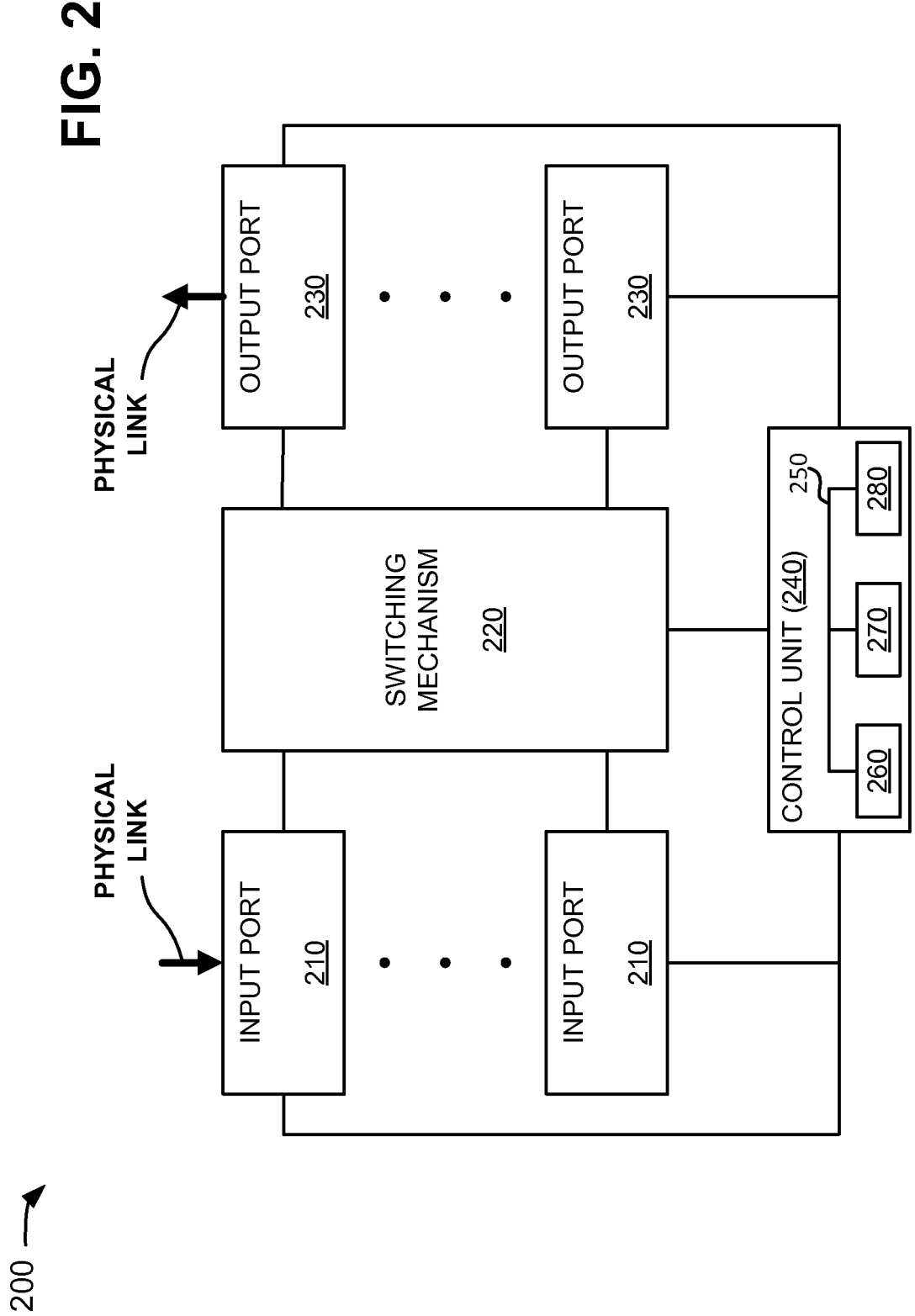
FIG. 2 illustrates a diagram of exemplary components of an inter domain resource manager (IDRM), a home agent (HA), a correspondent node (CN), a correspondent network resource manager (CNRM), and/or a foreign agent (FA) of the network depicted in FIG. 1.

FIG. 2 is an exemplary diagram of a device 200 that may correspond to, for example, any of IDRM 110, HA 120, CN 130, CNRM 135, and/or one of FAs 140. As illustrated, device 200 may include input ports 210, a switching mechanism 220, output ports 230, and/or a control unit 240. Input ports 210 may be the points of attachments for physical links and may be the points of entry for incoming traffic. Switching mechanism 220 may interconnect input ports 210 with output ports 230. Output ports 230 may store the traffic and may schedule the traffic on one or more output physical links. Control unit 240 may use routing protocols and may create a forwarding table that is used in traffic forwarding.

Input ports 210 may carry out datalink layer encapsulation and decapsulation. Input ports 210 may look up a destination address of incoming traffic (e.g., any type or form of data, such as packet or non-packet data) in a forwarding table to determine its destination port (i.e., route lookup). In order to provide quality of service (QoS) guarantees, input ports 210 may classify traffic into predefined service classes. Input ports 210 may run datalink-level protocols and/or network-level protocols.

Switching mechanism 220 may provide a link between input ports 210 and output ports 230. For example, switching mechanism 220 may include a group of switching devices that route traffic from input ports 210 to output ports 230.

Output ports 230 may store traffic before it is transmitted on an output link. Output ports 230 may include scheduling algorithms that support priorities and guarantees. Output ports 230 may support datalink layer encapsulation and decapsulation, and/or a variety of higher-level protocols.

Control unit 240 may interconnect with input ports 210, switching mechanism 220, and output ports 230. Control unit 240 may compute a forwarding table, use routing protocols, and/or run software to configure and manage device 200. Control unit 240 may handle any traffic whose destination address may not be found in the forwarding table.

In one implementation, control unit 240 may include a bus 250 that may include a path that permits communication among a processor 260, a memory 270, and a communication interface 280. Processor 260 may include processors, microprocessors, or other types of processing units (e.g., application specific integrated circuits (ASICs), field programmable gate arrays (FPGAs), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

As described herein, device 200 may perform certain operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
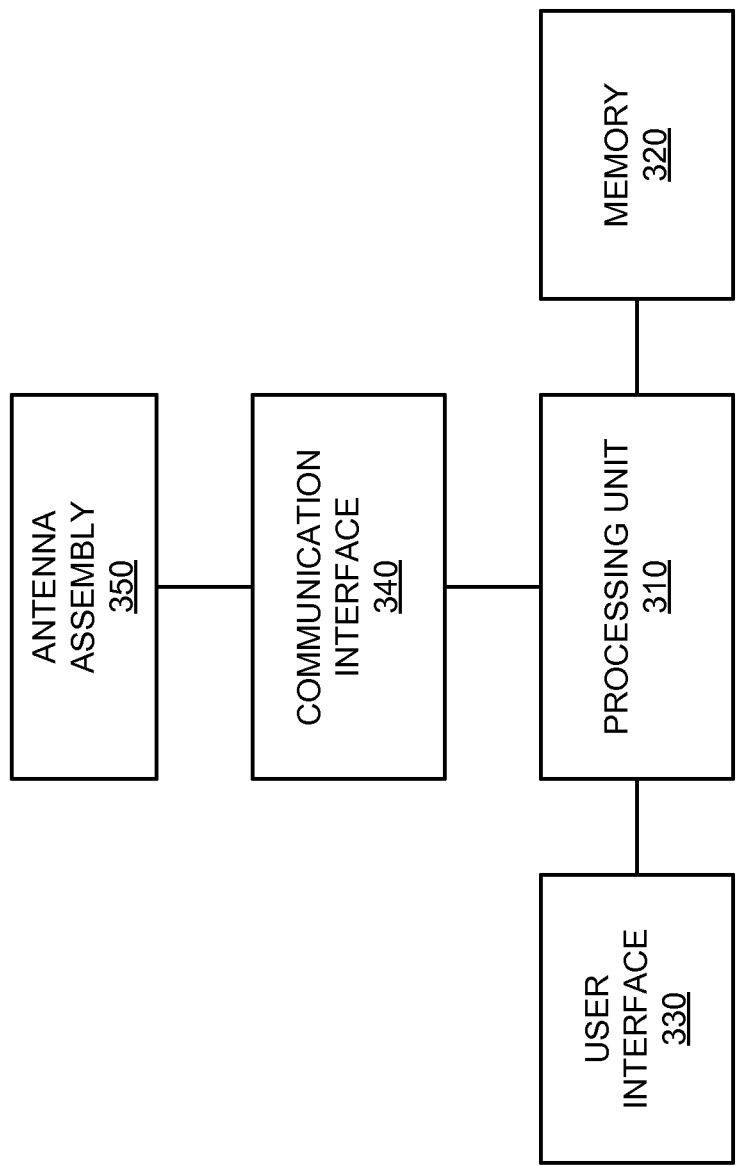
FIG. 3 depicts a diagram of exemplary components of a mobile device of the network illustrated in FIG. 1.

FIG. 3 depicts a diagram of exemplary components of a device 300 that may correspond to, for example, mobile device 150. As illustrated, device 300 may include a processing unit 310, memory 320, a user interface 330, a communication interface 340, and/or an antenna assembly 350.

Processing unit 310 may include one or more processors, microprocessors, ASICs, FPGAs, or the like. Processing unit 310 may control operation of device 300 and its components. In one implementation, processing unit 310 may control operation of components of device 300 in a manner described herein.

Memory 320 may include a RAM, a ROM, and/or another type of memory to store data and instructions that may be used by processing unit 310.

User interface 330 may include mechanisms for inputting information to device 300 and/or for outputting information from device 300. Examples of input and output mechanisms might include buttons (e.g., control buttons, keys of a keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); and/or a vibrator to cause device 300 to vibrate.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network (e.g., network 160).

As will be described in detail below, device 300 may perform certain operations described herein in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
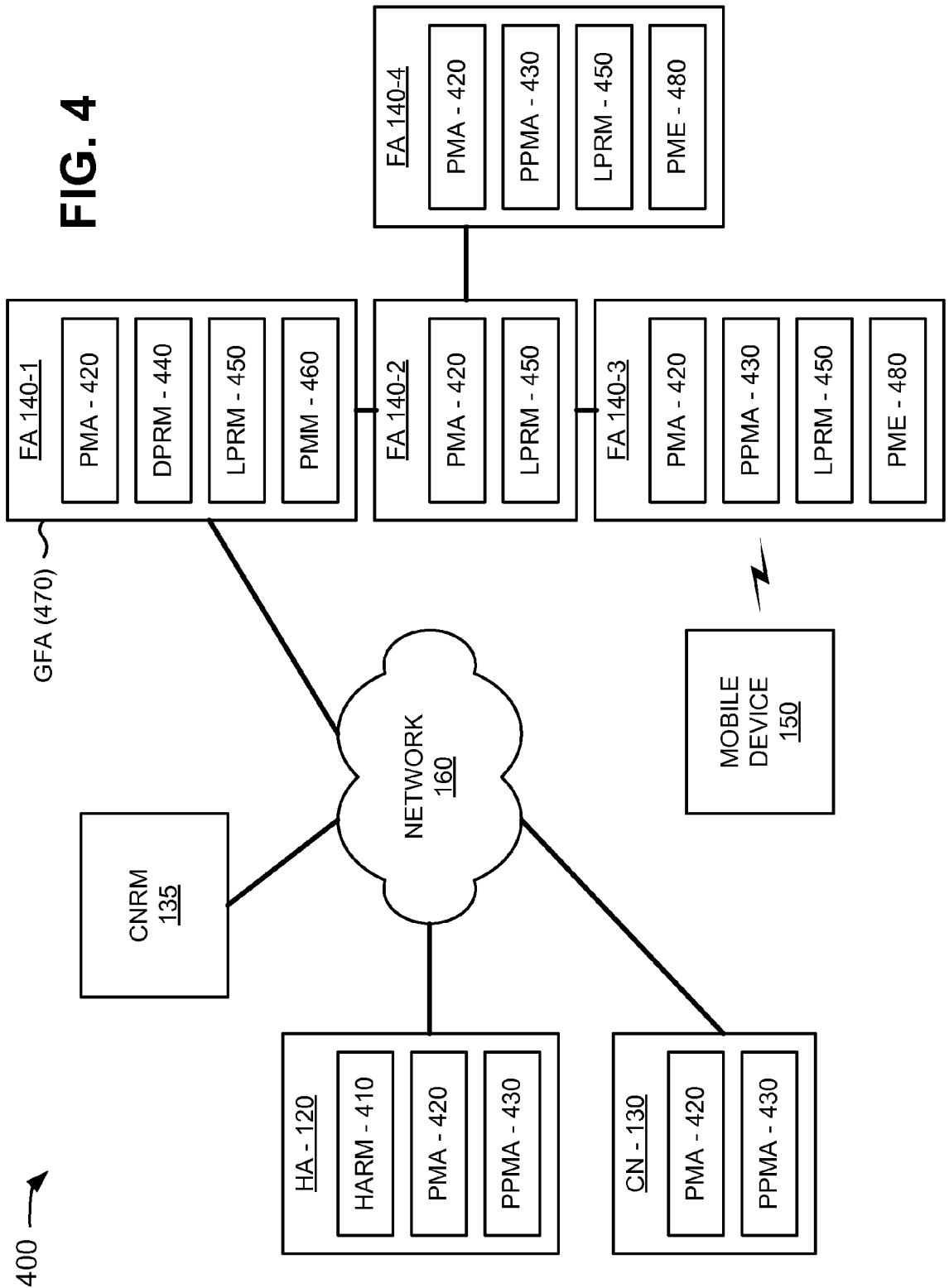
FIG. 4 illustrates a diagram of exemplary interrelations among components of an exemplary portion of the network depicted in FIG. 1.

FIG. 4 illustrates a diagram of exemplary interrelations among components of an exemplary portion 400 of network 100. As shown, exemplary network portion 400 may include HA 120, CN 130, CNRM 135, FAs 140-1, . . . , 140-4, and mobile device 150. HA 120, CN 130, CNRM 135, FAs 140-1, . . . , 140-4, and mobile device 150 may include the features described above in connection with, for example, FIG. 1. HA 120, CN 130, CNRM 135, and FA 140-1 may interconnect with network 160 via wired and/or wireless connections. FA 140-2 may interconnect with FA 140-1, FA 140-3, and/or FA 140-4 via wired and/or wireless connections. Mobile device 150 may interconnect with FA 140-3 via wired and/or wireless connections.

As further shown in FIG. 4, HA 120 may include a home agent resource manager (HARM) 410, a performance monitoring agent (PMA) 420, and a proxy performance monitoring agent (PPMA) 430. HARM 410, PMA 420, and PPMA 430 may be implemented (e.g., as hardware or a combination of hardware and software) by one or more of the components of device 200 (FIG. 2). HARM 410 may include hardware or a combination of hardware and software that may allocate network resources between a home network (e.g., associated with HA 120) and other networks (e.g., networks associated with FAs 140). HARM 410 may communicate with a domain policy and resource manager (DPRM) (e.g., described below in connection with FA 140-1) and/or IDRM 110 in order to allocate network resources between a home network and other networks. PMA 420 may include hardware or a combination of hardware and software that may generate and/or process messages related to performance monitoring, and may forward local test results to a performance monitoring manager (PMM) (e.g., described below in connection with FA 140-1). PPMA 430 may include hardware or a combination of hardware and software that may generate and/or process messages associated with performance monitoring when emulating a mobile device in a corresponding FA.

As further shown in FIG. 4, CN 130 may include a PMA 420 and a PPMA 430. PMA 420 and PPMA 430 may be implemented (e.g., as hardware or a combination of hardware and software) by one or more of the components of device 200 (FIG. 2). PMA 420 and PPMA 430 may include the features described above in connection with HA 120.

FA 140-1, as shown in FIG. 4, may include a PMA 420, a DPRM 440, a local policy and resource manager (LPRM) 450, and a PMM 460. PMA 420, DPRM 440, LPRM 450, and PMM 460 may be implemented (e.g., as hardware or a combination of hardware and software) by one or more of the components of device 200 (FIG. 2). PMA 420 may include the features described above in connection with HA 120.

DPRM 440 may include hardware or a combination of hardware and software that may monitor and/or allocate network resources in a hierarchical domain (e.g., FA 140-1, via DPRM 440, may monitor and/or allocate resources in a domain that includes FAs 140-2, 140-3, and 140-4). In one example, DPRM 440 may have a wider scope of visibility and/or control relative to LPRM 450. DPRM 440 may interface with different network components to modify configurations so that resource requests may be satisfied.

LPRM 450 may include hardware or a combination of hardware and software that may monitor and/or allocate network resources on directly connected links (e.g., FA 140-2, via LPRM 450, may allocate network resources on links between FA 140-2 and FA 140-1, 140-3, and/or 140-4). If LPRM 450 cannot allocate appropriate network resources associated with a resource request (e.g., a registration request), LPRM 450 may forward the resource request to DPRM 440 for processing.

PMM 460 may include hardware or a combination of hardware and software that may manage one or more PMAs (e.g., PMA 420) in a domain. PMM 460 may interact with DPRM 440 and/or LPRM 450 to identify metrics to be verified in a performance monitoring (PM) test, and may intercept, compile, and/or process PM test result reports provided by other PMAs in the domain.

As further shown in FIG. 4, FA 140-1 may be a GFA 470 that provides a gateway between a network (e.g., network 160) and other FAs (e.g., FAs 140-2, 140-3, and 140-4). FA 140-2 may include a PMA 420 and a LPRM 450. PMA 420 may include the features described above in connection with HA 120. LPRM 450 may include the features described above in connection with FA 140-1. Each of FAs 140-3 and 140-4 may include a PMA 420, a PPMA 430, a LPRM 450, and a proxy and mobile emulation (PME) 480. PMA 420 and PPMA 430 may include the features described above in connection with HA 120. LPRM 450 may include the features described above in connection with FA 140-1. PME 480 may include hardware or a combination of hardware and software that may supports a presence of a mobile device that does not support the Mobile-IP protocol. PME 480 may support standard Mobile-IP messaging and a resource allocation request function. PME 480 may also enable emulation of messaging to/from mobile devices in a corresponding FA.

Exemplary network portion 400 may support mobile users (e.g. mobile device 150). For example, HA 120, FAs 140-1, . . . 140-4, and mobile device 150 may support mobile device mobility using the Mobile-IP protocol. In some implementations, proxy Mobile-IP provided on one or more FAs can be used in cases where a mobile device does not support the Mobile-IP protocol. One or more of HARM 410, PMA 420, PPMA 430, DPRM 440, LPRM 450, PMM 460, and PME 480 may be used by exemplary network portion 400 to support performance monitoring-based resource management. Although one or more of HARM 410, PMA 420, PPMA 430, DPRM 440, LPRM 450, PMM 460, and/or PME 480 may be supported on dedicated devices, in other implementations, one or more of HARM 410, PMA 420, PPMA 430, DPRM 440, LPRM 450, PMM 460, and/or PME 480 can be co-located with existing elements supporting a mobility environment. Exemplary network portion 400 may be flexible enough to accommodate multiple resource scope models. For example, network resources may need to be allocated only on mobile domain requiring resource management (RM) and performance monitoring (PM) support in the hierarchical domain. This may be the case, for example, when network resources between GFA 470 (e.g., FA 140-1) and each of HA 120 and CN 130 have been allocated in advance on a long term basis.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
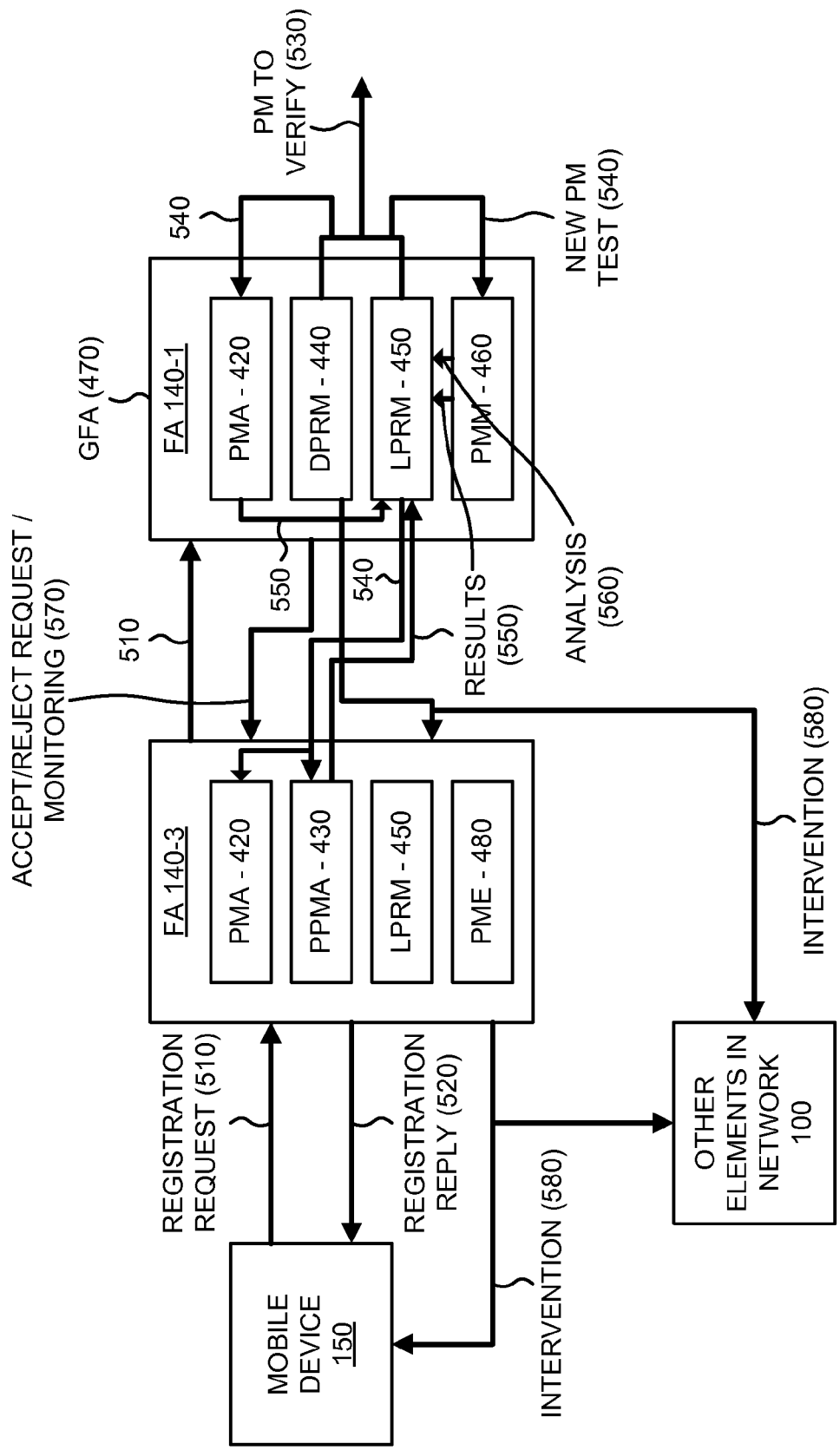
FIG. 5 depicts a diagram of exemplary interactions among components of another exemplary portion of the network illustrated in FIG. 1.

FIG. 5 depicts a diagram of exemplary interactions among components of another exemplary portion 500 of network 100. As shown, exemplary network portion 500 may include FA 140-1, FA 140-3, and mobile device 150. FA 140-1, FA 140-3, and mobile device 150 may include the features described above in connection with, for example, FIGS. 1-4.

As further shown in FIG. 5, when mobile device 150 moves to a new service area, mobile device 150 may provide a registration request 510 to a current FA (e.g., FA 140-3). Registration request 510 may be forwarded to appropriate elements of network portion 400 (or network 100) (e.g., elements that need to know about the new service area). In response to registration request 510, a reply may be provided to mobile device 150. Registration request 510 may include a local registration extension and may be extended to support both resource management (RM) and performance monitoring (PM) extensions. The RM extension of registration request 510 may support notification and processing of a requested QoS and corresponding functions. The PM extension of registration request 510 may support performance monitoring activities that provide feedback information for the RM process. The RM function may be supported by DPRM 440 (e.g., which may reside on GFA 470) and LPRM 450 (e.g., which may reside on GFA 470 and FA 140-3). The PM function may be supported by PMA 420 (e.g., which may reside on GFA 470 and FA 140-3). Further details of registration request 510 are provided below in connection with, for example, FIGS. 6 and 7.

FA 140-3 may receive registration request 510 and may verify if mobile device 150 is authorized to generate the PM extension of registration request 510. If mobile device 150 is verified, it may be reflected in a registration reply 520 (e.g., based on reference number 570, described below) and FA 140-3 may provide registration request 510 to FA 140-1 (e.g., GFA 470). DPRM 440 and LPRM 450 (e.g., of FA 140-1 and/or FA 140-3) may inspect QoS requirements associated with registration request 510, and may identify performance monitoring (PM) aspects of registration request 510 that need to be verified, as indicated by reference number 530. DPRM 440/LPRM 450 may inspect available PM information of registration request 510 to identify if a new PM test 540 is needed to make a RM decision. If new PM test 540 is needed to make a RM decision, DPRM 440/LPRM 450 may provide new PM test 540 to PMA 420 and/or PPMA 430 (e.g., of FA 140-1 and/or FA 140-3) and/or to PMM 460 (e.g., of FA 140-1). PMA 420, PPMA 430, and/or PMM 460 may receive new PM test 540, may perform new PM test 540 (e.g., may identify involved network elements and test profiles), and may collect results 550 of performance of new PM test 540. PMA 420, PPMA 430, and/or PMM 460 may provide results 550 to LPRM 450 (and/or to DPRM 440). PMM 460 may analyze results 550, and may provide its analysis 560 to LPRM 450 (and/or to DPRM 440).

In one exemplary implementation, PMM 460 may maintain (and/or store) a PM view table, and may make the PM view table available to DPRM 440 and LPRM 450. A PM view table may be a data structure that tracks results of performance monitoring test results and provides a view of recently obtained performance metrics. The PM view table may store the performance metrics over a topology for a configurable period of time (e.g., after which results are not considered valid). Before starting a new PM test, PMM 460 may inspect the PM view table to determine whether there are new results that may be used to support the RM decision making such that performance of a PM test is not needed. Thus, the PM view table may prevent performance of a PM test unless the PM test is justified. In some situations, multiple mobile devices may follow a similar mobility pattern with similar resource requirements. For example, in some mobile networks, a group of mobile devices may move together and may be involved in activities related to similar applications. In such a scenario, a PM test may be implemented for a single mobile device, and the obtained result may be applicable to the other mobile devices (e.g., which may prevent unnecessary PM testing overhead).

LPRM 450 may receive results 550 and/or analysis 560, and may determine whether registration request 510 can be accommodated based on results 550 and/or analysis 560. Alternatively and/or additionally, if DPRM 440/LPRM 450 do not identify a new PM test to execute, LPRM 450 may determine whether registration request 510 can be accommodated based on available information (e.g., QoS requirements, PM aspects, etc. associated with registration request 510). If registration request 510 can be accommodated, FA 140-1 may accept registration request 510, as indicated by reference number 570, and may provide acceptance 570 to FA 140-3 (which, in turn, may provide acceptance 570 to mobile device 150).

If registration request 510 cannot be accommodated, LPRM 450 may forward registration request 510 to DPRM 440 (e.g., of FA 140-1 and/or FA 140-3) to determine whether an intervention (e.g., modifying a topology and/or configuration to satisfy registration request 510) is possible. If an intervention is not possible, DPRM 440 may reject registration request 510, as indicated by reference number 570, and FA 140-1 may provide rejection 570 to FA 140-3 (which, in turn, may provide rejection 570 to mobile device 150). If an intervention is possible, FA 140-1 (e.g., DPRM 440) may implement the intervention (e.g., as indicated by reference number 580) and DPRM 440/LPRM 450 may determine if a new PM test is needed (e.g., to determine if the intervention achieved requested performance enhancements). As shown in FIG. 5, intervention 580 may be implemented via mobile device 150 and/or other elements in network 100 (FIG. 1).

Considering the dynamics associated with network performance and available resources in networks in general, and with a mobile environment in particular, FA 140-1 and/or FA 140-3 (e.g., DPRM 440 and/or LPRM 450) may verify if performance metrics are maintained as long as needed. Whether FA 140-1 accepts or rejects registration request 510, FA 140-1 and/or FA 140-3 (e.g., DPRM 440 and/or LPRM 450) may determine whether continuous performance monitoring is necessary. When continuous performance monitoring is determined to be needed (e.g., as indicated by reference number 570), DPRM 440 and/or LPRM 450 may implement a timer function that is configured to trigger an appropriate PM test (e.g., new PM test 540) at an appropriate time. When a session is terminated, the corresponding timer function may also be terminated, and FA 140-1 and/or FA 140-3 may wait for a new and/or updated registration request (e.g., from mobile device 150).

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

FIG. 6 illustrates a diagram of an exemplary format of an allocation extension of registration request 510. The allocation extension may correspond to a RM extension. A RM extension may provide an indication that a mobile device (e.g., mobile device 150) expects specific resources to be allocated. The requested resources may be detailed in the RM extension. As shown in FIG. 6, the allocation extension of registration request 510 may include an allocation extension type field 600, an allocation extension length field 610, an allocation extension sub-type field 620, and an allocation extension data field 630.

Allocation extension type field 600 may provide an indication of a type of message associated with registration request 510. For example, allocation extension type field 600 may indicate that registration request 510 is a resource allocation message. Allocation extension length field 610 may provide a length of the allocation extension (e.g., in bytes) of registration request 510. Allocation extension sub-type field 620 may provide an indication of a sub-type of the message associated with registration request 510. For example, a sub-type of "1" may indicate that registration request 510 includes a resource allocation request, and a sub-type of "2" may indicate that registration reply 520 includes a resource allocation reply.

Allocation extension data field 630 may include details regarding a network resource request (e.g., provided by registration request 510). For example, allocation extension data field 630 may include information, such as: a resource request identification (ID); a requesting entity (e.g., "1" may indicate a mobile device and "2" may indicate a FA); a requested allocation type (e.g., "1" may indicate an individual element-based and "2" may indicate an aggregate-based); a requested resource direction (e.g., "1" may indicate upstream, "2" may indicate downstream, and "3" may indicate upstream and downstream); a resource allocation end-point (e.g., "1" may indicate a GFA, "2" may indicate a HA, and "3" may indicate a CN); an address of the end-point; a requested resource upstream; a requested resource downstream; a resource marking upstream; a resource marking downstream; a resource requested duration in seconds; an allocation request mode (e.g., "1" may indicate end-to-end strict, "2" may indicate end-to-end soft, "3" may indicate local strict, and "4" may indicate local soft); etc.

Although FIG. 6 shows an exemplary format of an allocation extension of registration request 510, in other implementations, registration request 510 may contain fewer, different, differently arranged, or additional fields than depicted in FIG. 6.

FIG. 7 depicts a diagram of an exemplary format of a performance monitoring (PM) extension of registration request 510. The PM extension may indicate that performance metrics verification is required to support a resource allocation decision. The PM extension may also include information regarding parameters to be used for PM testing. As shown in FIG. 7, the PM extension of registration request 510 may include a PM extension type field 700, a PM extension length field 710, a PM extension sub-type field 720, and a PM extension data field 730.

PM extension type field 700 may provide an indication of a type of message associated with registration request 510. For example, PM extension type field 700 may indicate that registration request 510 is a PM set up message. PM extension length field 710 may provide a length of the PM extension (e.g., in bytes) of registration request 510. PM extension sub-type field 720 may provide an indication of a sub-type of the message associated with registration request 510. For example, a sub-type of "1" may indicate that registration request 510 is a PM test session setup request, and a sub-type of "2" may indicate that registration reply 520 is a PM test session setup acknowledgment.

PM extension data field 730 may include a representation of a test profile (e.g., provided by registration request 510). For example, PM extension data field 730 may include information, such as: a do not fragment flag (e.g., "0" may indicate that the flag is not set and "1" may indicate that the flag is set);

a system resource monitoring flag (e.g., "0" may indicate that monitoring is disabled and "1" may indicate that monitoring is enabled); a test profile type flag (e.g., "0" may indicate that the test profile is predefined and "1" may indicate that the test profile is customized); a test termination type flag (e.g., "1" may indicate that test termination is time based, "2" may indicate that test termination is number of packets based, and "3" may indicate that test termination is mobility events based); a test packet length mode flag (e.g., "0" may indicate that the test packet length is fixed and "1" may indicate that the test packet length is variable); a packet rate mode flag (e.g., "0" may indicate that the packet rate mode is constant and "1" may indicate that the packet rate mode is variable); a source IP address; a destination IP address; a transport protocol type; a source port number; a destination port number; a type of service; a test packet length; an in-transient allowance; a packet length distribution vector; a packet rate distribution vector; a measurement profile; etc.

In one exemplary implementation, mobile device 150 (or PPMA 430) may include an initial set of parameters in the PM extension, while DPRM 440 and LPRM 450 may modify those parameters to best fit support needed for the resource allocation process. For example, mobile device 150 may identify a particular differentiated services code point (DSCP) value and packet length for test traffic. On the other hand, service traffic may be mapped to different DSCP values over different links, and tunneling mechanisms (e.g., generic routing encapsulation (GRE)) may suggest use of different packet lengths for the test traffic. Since a network path traversed by the traffic may not be known to mobile device 150, DPRM 440 and LPRM 450 (e.g., considering the visibility into the network topology) may be in position to select more appropriate values for those parameters. For example, a measurement profile field may be set to a value that correlates to QoS requirements identified in the RM extension (FIG. 6). In another example, if mobile device 150 is utilizing a voice-over-IP (VoIP) service, it may be appropriate for the PM test to measure both delay and jitter values (e.g., which may impact perceived quality of voice).

A mobile environment may be very dynamic by nature. Mobility events and other factors (e.g., sensitivity to weather conditions and geography) may contribute to this dynamic nature. The integration of the PM and RM extensions (e.g., into registration request 510) may permit systems and/or methods described herein to consider decisions that optimize performance in this dynamic environment.

Although FIG. 7 shows an exemplary format of a PM extension of registration request 510, in other implementations, registration request 510 may contain fewer, different, differently arranged, or additional fields than depicted in FIG. 7.

In exemplary implementations, some mobile devices may not have Mobile-IP protocol support. In such a scenario, the mobile devices may not support Mobile-IP messaging, and, accordingly, the PM and RM extensions may not be included in a registration request (e.g., registration request 510). To support IP mobility for these types of mobile devices, a FA (e.g., FA 140) may act as a Mobile-IP proxy that provides support for basic messaging associated with the Mobile-IP. To support performance monitoring-based resource management for these types of mobile devices, the FA may be extended to support PPMA 430 and PME 480. PPMA 430 may allow the FA to emulate the mobile devices and amend the registration request with the PM extension. PPMA 430 may also participate in both execution and reporting of PM tests. PME 480 may emulate the mobile devices and may add the RM extension in case the mobile devices do not support Mobile-IP. In addition, PME 480 may support mobility events that require strict requirements (e.g., as described below in connection with, for example, FIGS. 8-11).

When a mobile device moves from one service area to another, there may be an expectation that a similar QoS is maintained in the new service area. Domains associated with service areas may overlap and multiple technologies may be available to the mobile device to attach to the service areas. In one exemplary implementation, advanced verification may be utilized by the systems and/or methods described herein in order to enhance network performance and verify that a particular configuration satisfies requirements when the mobile device moves to a new FA. With advanced verification, imminent movement of the mobile device (e.g., to a new service area) may trigger an advanced RM process that allocates resources associated with the new service area such that service degradation is minimized. In order to minimize service degradation, a PM test may be triggered to verify network resources (e.g., FAs 140) in the new service area. Mobile emulation may play a critical role here since the mobile device may not have moved to the new service area. However, there may be a need to verify performance if the mobile device is to select an optimal service area. To support this capability, PME 480 may emulate a mobile device in order to support PM testing. FIGS. 8-11 describe scenarios that may be used when a mobile device moves to a new service area, and/or when there is a need to change an access method or to provide a different QoS treatment.

Figure 8:
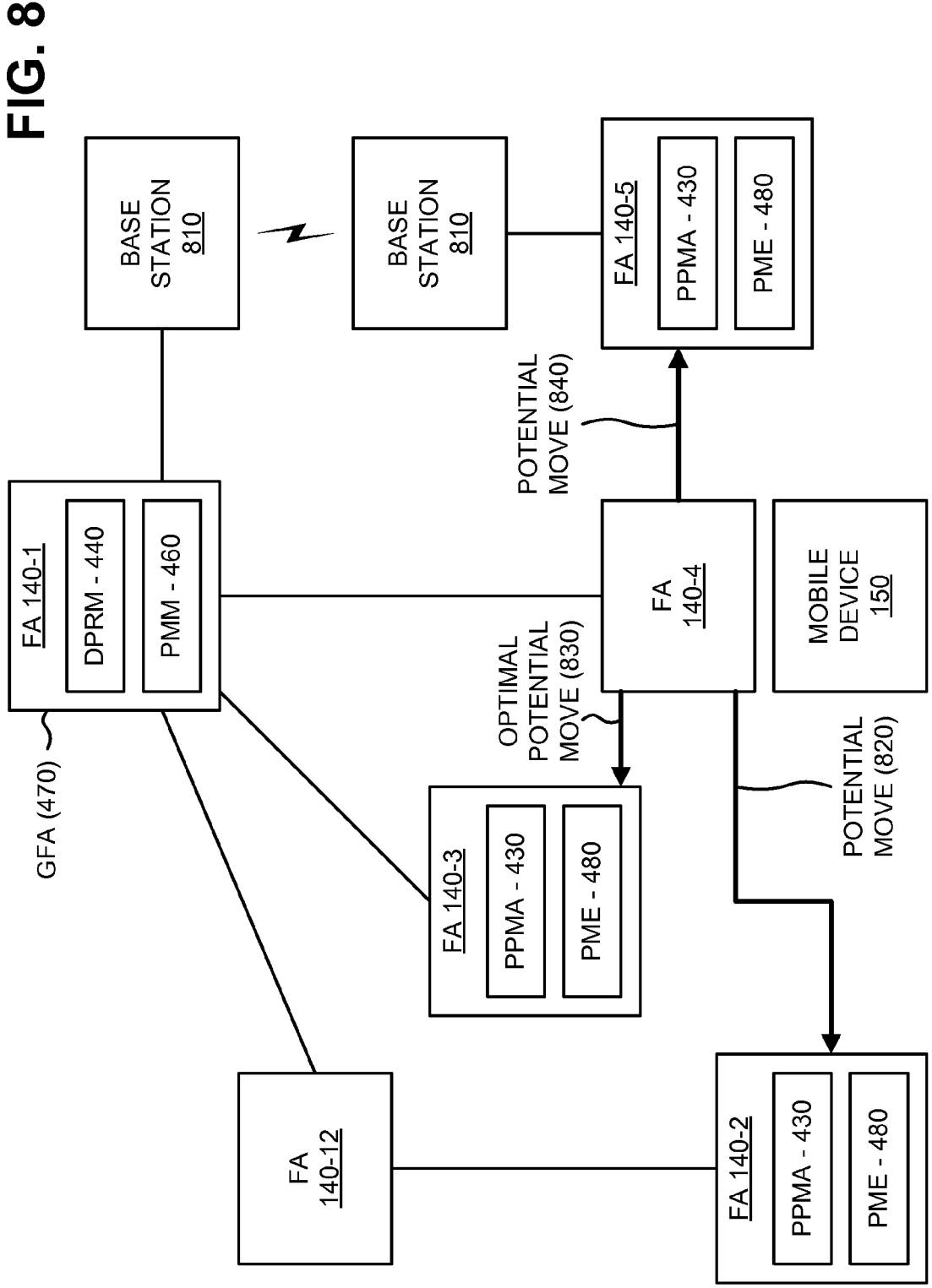
FIG. 8 illustrates a diagram of exemplary interactions among components of an exemplary portion of the network depicted in FIG. 1.

FIG. 8 illustrates a diagram of exemplary interactions among components of an exemplary portion 800 of network 100. In one implementation, network portion 800 may depict interactions that select a best service area to move to (e.g., by mobile device 150) if more than one service area is available. As shown in FIG. 8, network portion 800 may include FAs 140-1, 140-2, 140-3, 140-4, 140-5, and 140-12, mobile device 150, and base stations 810. FAs 140-1, 140-2, 140-3, 140-4, 140-5, and 140-12 and mobile device 150 may include the features described above in connection with, for example, FIGS. 1-4. Each of base stations 810 may include one or more devices that receive voice and/or data from one device (e.g., from FA 140-1) and transmit that voice and/or data to another device (e.g., FA 140-5) via an air interface.

As further shown in FIG. 8, mobile device 150 may be associated with FA 140-4. FA 140-1 may interconnect with FAs 140-3, 140-4, and 140-12 (e.g., via wired and/or wireless connections), and may also interconnect with one of base stations 810 (e.g., via wired and/or wireless connections). Base stations 810 may interconnect with each (e.g., via wireless connections), and one of base stations 810 (e.g., not connected to FA 140-1) may interconnect with FA 140-5 (e.g., via wired and/or wireless connections). FA 140-12 may interconnect with FA 140-2 (e.g., via wired and/or wireless connections).

Mobile device 150 may have a potential move 820 to FA 140-2, a potential move 830 to FA 140-3, or a potential move 840 to FA 140-5. PPMA 430 and PME 480 may emulate mobile devices at each of FAs 140-2, 140-3, and 140-5 (e.g., service areas) and may execute a PM test to verify performance metrics associated with each of FAs 140-2, 140-3, and 140-5 (e.g., service areas) such that an optimal next service area may be selected. In one example, FA 140-2 may be associated with a path that is characterized by a longer delay and higher jitter value due to additional processing at FA 140-12. In another example, a path from FA 140-1 to FA 140-5 may include a low bandwidth wireless link (e.g., between base stations 810). PMM 460 (e.g., of FA 140-1) may analyze results of the PM test for the different FAs (e.g., FAs 140-2, 140-3, and 140-5), and may select FA 140-3 as the optimal service area to which to move (e.g., optimal potential move 830). In another implementation, the PM test results may be forwarded to DPRM 440 (e.g., of FA 140-1), and DPRM 440 may select the service area that provides the optimal performance. Mobile device 150 may then move to and be associated with FA 140-3 (e.g., an optimal service area).

Although FIG. 8 shows exemplary components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800.

Figure 9:
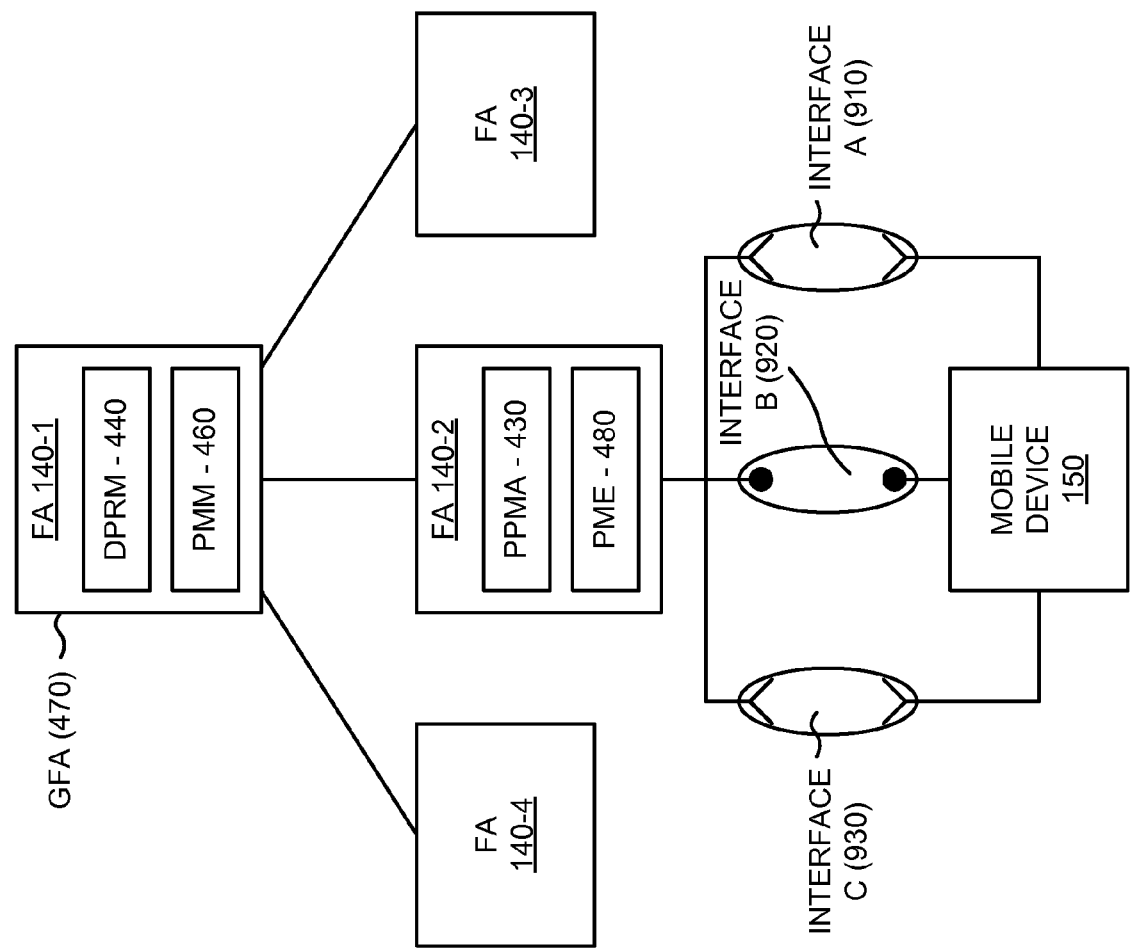
FIG. 9 depicts a diagram of exemplary interactions among components of another exemplary portion of the network illustrated in FIG. 1.

FIG. 9 depicts a diagram of exemplary interactions among components of another exemplary portion 900 of network 100. In one implementation, network portion 900 may depict interactions that select a best technology for a mobile device to use and/or select a number of interfaces on the mobile device. As shown in FIG. 9, network portion 900 may include FAs 140-1, . . . , 140-4 and mobile device 150. FAs 140-1, . . . , 140-4 and mobile device 150 may include the features described above in connection with, for example, FIGS. 1-4.

As further shown in FIG. 9, mobile device 150 may be associated with FA 140-2. Mobile device 150 may interconnect with FA 140-2 via one or more interfaces, such as interface A 910, interface B 920, and/or interface C 930. Interfaces 910-930 may include communication interfaces of same or different technologies. FA 140-1 may interconnect with FAs 140-2, 140-3, and 140-4 (e.g., via wired and/or wireless connections).

In one exemplary implementation, upon a move to a new service area (e.g., a new FA), or after a change in the quality of an existing connection, mobile device 150 may have an option of selecting which interface technology (e.g., interfaces 910-930) to use to connect to a current service area (e.g., FA 140-2). A PMA associated with mobile device 150, or PPMA 430 and PME 480 (e.g., of FA 140-2), may implement a PM test to verify which interface technology may provide optimal performance. PMM 460 (e.g., of FA 140-1), based on resource requirements expressed by mobile device 150 and/or results of the PM test, may analyze a topology (e.g., network and wireless access) and may instruct mobile device 150 to use one or more of interfaces 910-930 that best support its requirements.

In another exemplary implementation, if mobile device 150 is capable of supporting multiple active simultaneous interfaces (e.g., interfaces 910-930), mobile device 150 may be able to transmit and receive information at higher rates. To take advantage of the additional interfaces, mobile device 150 may need to verify that network resources can accommodate the additional bandwidth. Systems and/or methods described herein may instruct mobile device 150 to enable an appropriate number of interfaces (e.g., interfaces 910-930) to optimize a user experience. For example, the systems and/or methods may analyze PM test results, and may instruct mobile device 150 to enable one or more of interfaces 910-930 such that optimum performance may be achieved. Enabling a smaller number of interfaces may prevent mobile device 150 from experiencing the best service quality, while enabling too many interfaces may waste available resources without achieving a better service quality for mobile device 150.

In still another exemplary implementation, systems and/or methods described herein may select a wireless path. If mobile device 150 moves to a new service area (or experiences a change in a quality of an existing connection), the systems and/or methods may instruct a network (e.g., network 100) and mobile device 150 to use a different wireless path that provides better performance metrics (e.g., such as lower delay).

If a mobile device moves from one service area to another service area, corresponding activities may take place. Depending on an exact protocol and enhancements, such movement of a mobile device may cause service interruptions (e.g., packet loss during a hand-off process). An application level associated with a moving mobile device involved in communication sessions may not be aware of the mobility event, and quality degradation may be treated in a similar manner to degradation resulting from different causes (e.g., a queuing issue). Such a scenario may be associated with typical performance monitoring solutions and may lead to inaccurate results. In exemplary implementation, systems and/or methods described herein may integrate PM with a mobility support system such that the PM may have visibility into mobility support protocols. Such visibility may permit the PM to accurately interpret results and to identify a root cause of degraded performance metrics.

Although FIG. 9 shows exemplary components of network portion 900, in other implementations, network portion 900 may contain fewer, different, differently arranged, or additional components than depicted in FIG. 9. In still other implementations, one or more components of network portion 900 may perform one or more other tasks described as being performed by one or more other components of network portion 900.

Figure 10A:
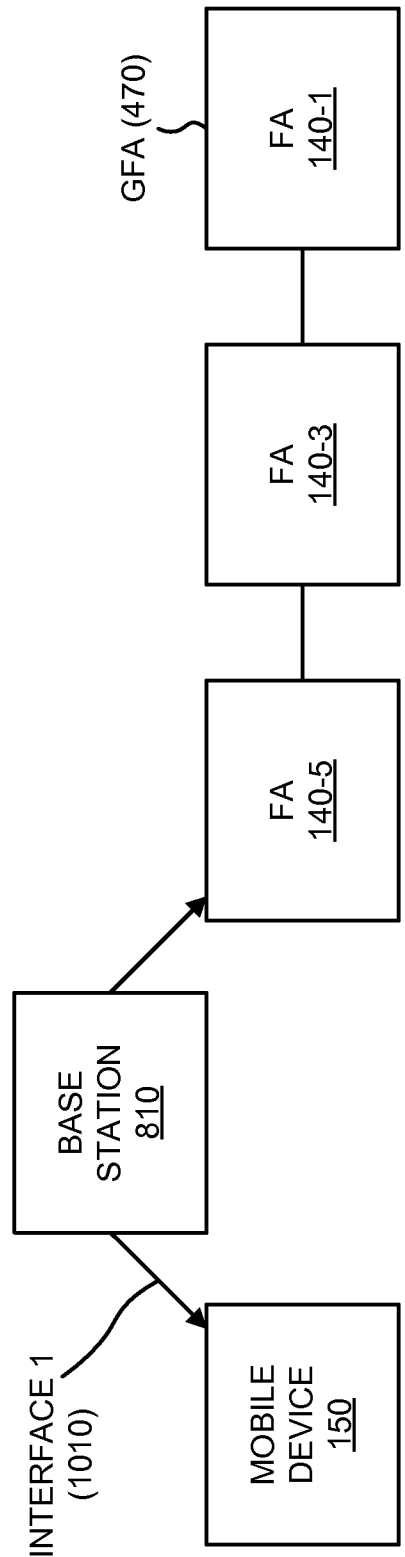
FIGS. 10A and 10B illustrate diagrams of exemplary interactions among components of still another exemplary portion of the network depicted in FIG. 1.
Figure 10B:
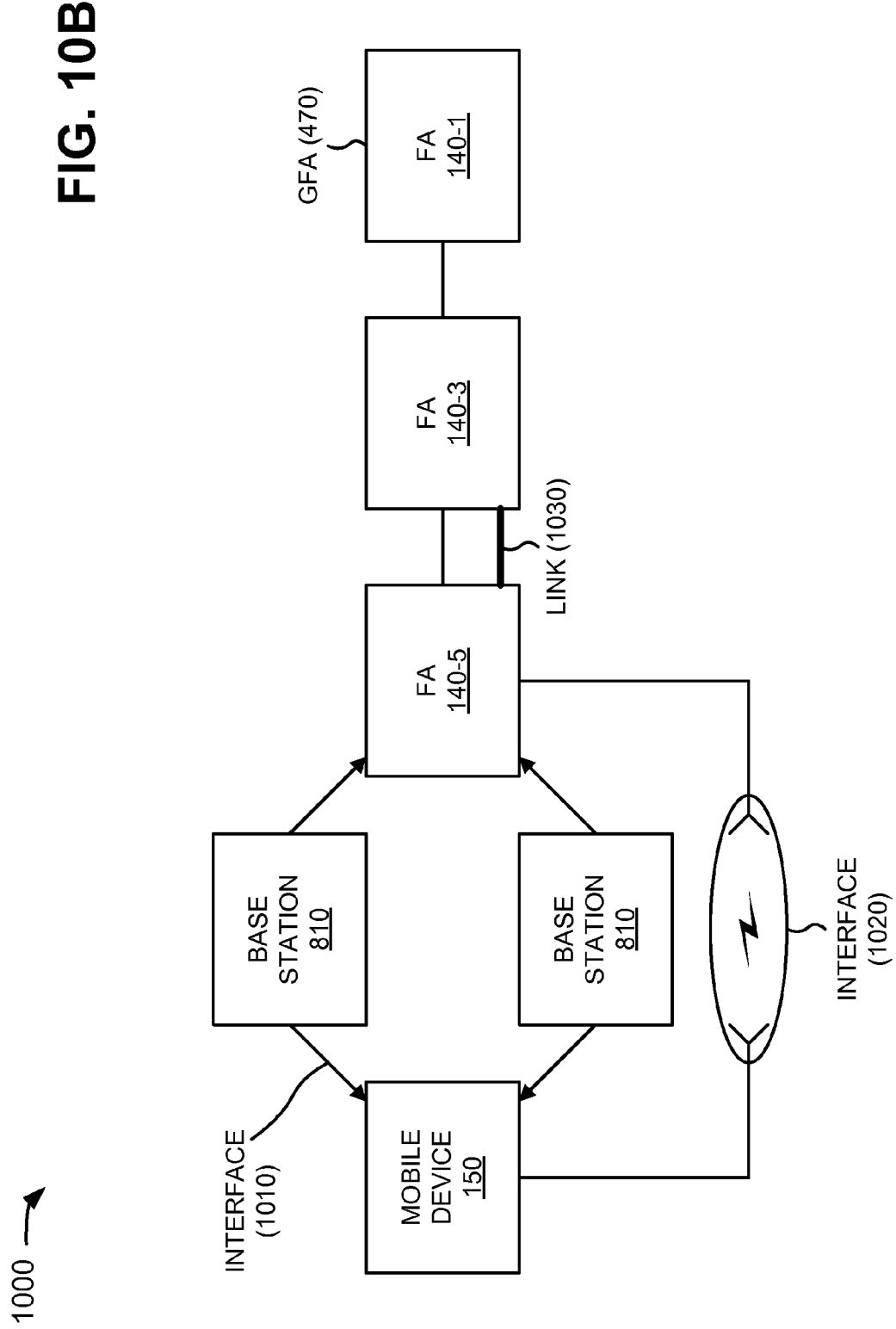

FIGS. 10A and 10B illustrate diagrams of exemplary interactions among components of an exemplary portion 1000 of network 100. In one implementation, network portion 1000 may depict a configuration and topology before execution of a PM test (FIG. 10A) and after execution of the PM test (FIG. 10B) (e.g., and acting on results of the PM test). As shown in FIG. 10A, network portion 1000 may include FAs 140-1, 140-3, and 140-5, mobile device 150, and base station 810. FAs 140-1, 140-3, and 140-5 and mobile device 150 may include the features described above in connection with, for example, FIGS. 1-4. Base station 810 may include the features described above in connection with, for example, FIG. 8. As further shown in FIG. 10A, mobile device 150 may be associated with FA 140-5 via an interface 1010 with base station 810. FA 140-1 may interconnect with FA 140-3 (e.g., via wired and/or wireless connections) and FA 140-3 may interconnect with FA 140-5 (e.g., via wired and/or wireless connections).

After execution of a PM test and acting on results of the PM test, network portion 1000 may include the components depicted in FIG. 10B. Determination, execution, and acting on results of the PM test (e.g., that modifies network portion 1000) are described below in connection with FIG. 11. As shown in FIG. 10B, network portion 1000 may include, in addition to the components shown in FIG. 10A, another base station 810, another interface 1020 between FA 140-5 and mobile device 150, and a link between FA 140-3 and FA 140-5. In one example, results of the PM test may instruct FA 140-5 and mobile device 150 to enable multipath (e.g., a routing technique of leveraging multiple alternative paths through a network) to reduce packet loss, and mobile device 150 may connect to FA 140-5 via both base stations 810 (e.g., as opposed to a single base station). In another example, results of the PM test may instruct mobile device 150 to enable interface 1020 (in addition to interface 1010), and mobile device 150 may establish interface 1020 with FA 140-5 (e.g., which may enable an increased aggregate bandwidth between mobile device 150 and FA 140-5). In still another example, results of the PM test may instruct provision of a faster link between FA 140-3 and FA 140-5 (e.g., to reduce target delay), and FA 140-3 and FA 140-5 may establish link 1030 between each other.

Although FIGS. 10A and 10B show exemplary components of network portion 1000, in other implementations, network portion 1000 may contain fewer, different, differently arranged, or additional components than depicted in FIGS. 10A and 10B. In still other implementations, one or more components of network portion 1000 may perform one or more other tasks described as being performed by one or more other components of network portion 1000.

Figure 11:
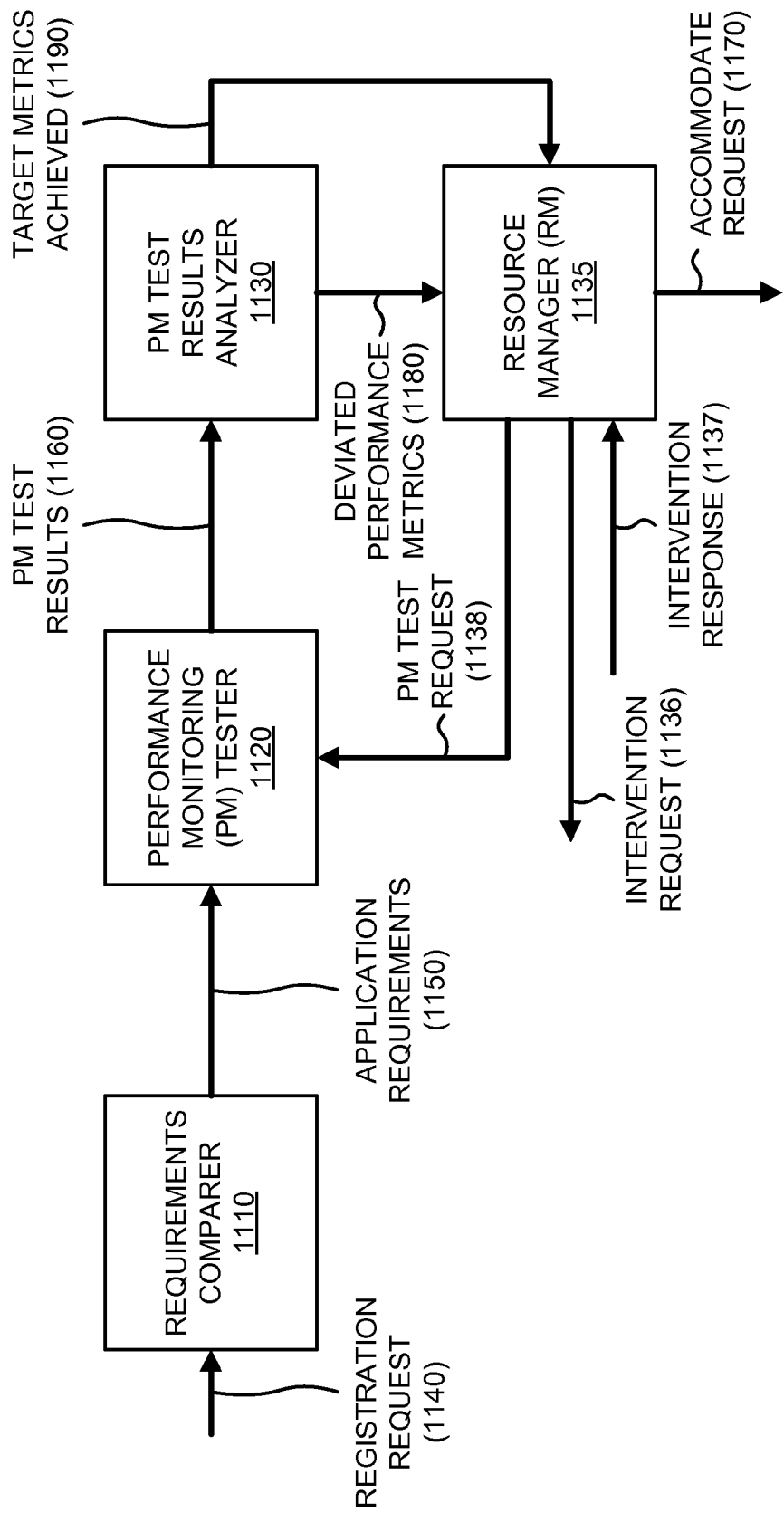
FIG. 11 depicts a diagram of exemplary functional components of a device that may correspond to the HA and/or one or more of the FAs depicted in FIG. 1.

FIG. 11 depicts a diagram of exemplary functional components of a device 1100 that may correspond to HA 120 and/or one or more of FAs 140. In one implementation, the functions described in connection with FIG. 11 may be performed by one or more of the devices (e.g., FAs 140, 1, 140-3, and/or 140-5) depicted in FIGS. 10A and 10B, and may cause network portion 1000 (FIG. 10A) to be modified as shown in FIG. 10B. In another implementation, the functions described in connection with FIG. 11 may be performed by one or more of the components of device 200 (FIG. 2). As shown, device 1100 may include a requirements comparer 1110, a PM tester 1120, a PM test results analyzer 1130, and a resource manager (RM) 1135.

Requirements comparer 1110 may include hardware or a combination of hardware and software that may receive a registration request 1140 from mobile device 150, and may compare requirements of registration request 1140 with a topology of a network (e.g., network 100) and options associated with mobile device 150. Registration request 1140 may include the features described above in connection with registration request 510. Based on the comparison, requirements comparer 1110 may identify application requirements 1150 associated with registration request 1140. Application requirements 1150 may include requirements that mobile device 150 desires to be implemented, such as a particular throughput (e.g., ten megabits per second (Mbps)), a particular maximum delay (e.g., forty milliseconds), a particular packet loss rate (e.g., less than or equal to 0.01%). Requirements comparer 1110 may provide application requirements 1150 to PM tester 1120.

PM tester 1120 may include hardware or a combination of hardware and software that may receive application requirements 1150 from requirements comparer 1110, and may develop one or more PM tests to measure relevant performance metrics (e.g., throughput, delay, packet loss, etc.) end-to-end in a network (e.g., network 100) and over different links of the network. PM tester 1120 may execute the one or more PM tests to generate PM test results 1160. PM test results 1160 may include information indicating whether the relevant performance metrics (e.g., throughput, delay, packet loss, etc.) have been achieved. PM tester 1120 may provide PM test results 1160 to PM test results analyzer 1130.

PM test results analyzer 1130 may include hardware or a combination of hardware and software that may receive PM test results 1160 from PM tester 1120, and may analyze PM test results 1160. PM test results analyzer 1130 may determine actions (e.g., to perform on network 100) based on the analysis of PM test results 1160. In one example, PM test results analyzer 1130 may identify deviated performance metrics 1180 (e.g., and corresponding links and/or network elements) based on the analysis of PM test results 1160, and may provide deviated performance metrics 1180 to RM 1135. Deviated performance metrics 1180 may include deviations from performance metrics (e.g., throughput, delay, packet loss, etc.), such as a throughput of five Mbps (rather than ten Mbps), a delay of sixty milliseconds (rather than forty milliseconds), and/or packet loss rate of greater than 0.01% (rather than less than or equal to 0.01%).

RM 1135 may receive deviated performance metrics 1180, may identify possible modified topology and/or configurations of the network (e.g., based on deviated performance metrics 1180), and may determine one or more PM tests to verify the modified topology/configurations of the network. In one example, and as further shown in FIG. 10B, RM 1135 may identify provisioning of a faster link (e.g., link 1030) between FA 140-3 and FA 140-5 (e.g., with a target delay of ten milliseconds) as a possible modification (e.g., via a PM test request 1138), and PM tester 1120 may execute a PM test upon the provisioning of such a faster link. Results of the PM test for the faster link may be provided from PM tester 1120 to PM test results analyzer 1130, and PM test results analyzer 1130 may determine if a target metric (e.g., a target delay of ten milliseconds) is achieved. If the target metric is not achieved, RM 1135 may further tune the provisioning of such a faster link until the target metric is achieved.

In another example, and as further shown in FIG. 10B, RM 1135 may identify enabling a second interface (e.g., interface 1020) between mobile device 150 and FA 140-5 (e.g., with a target bandwidth of ten Mbps) as a possible modification (e.g., via PM test request 1138), and PM tester 1120 may execute a PM test for the enabling of the second interface. Results of the PM test for the second interface may be provided from PM tester 1120 to PM test results analyzer 1130, and PM test results analyzer 1130 may determine if a target metric (e.g., a target bandwidth of ten Mbps) is achieved. If the target metric is not achieved, RM 1135 may further tune the enabling of the second interface until the target metric is achieved.

In still another example, and as further shown in FIG. 10B, RM 1135 may identify enabling a multipath (e.g., via second base station 810) between mobile device 150 and FA 140-5 (e.g., with a target of reduced packet loss rate) as a possible modification (e.g., via a PM test request 1138), and PM tester 1120 may execute a PM test for the enabling of the multipath. Results of the PM test for the multipath may be provided from PM tester 1120 to PM test results analyzer 1130, and PM test results analyzer 1130 may determine if a target metric (e.g., a reduced packet loss rate) is achieved. If the target metric is not achieved, RM 1135 may further tune the enabling of the multipath until the target metric is achieved.

As further shown in FIG. 11, if target metrics are achieved (e.g., as indicated by reference number 1190), RM 1135 may accommodate registration request 1140 (e.g., as indicated by reference number 1170). A network portion may then be modified based on the accommodation of registration request 1140. In one example, and as shown in FIGS. 10A and 10B, network portion 1000 may modified from the configuration shown in FIG. 10A to the configuration shown in FIG. 10B. If target metrics are not achieved, RM 1135 may issue an intervention request 1136 (e.g., requesting modification of a topology) and may receive an intervention response 1137 based on intervention request 1136.

Although FIG. 11 shows exemplary functional components of device 1100, in other implementations, device 1100 may contain fewer, different, differently arranged, or additional functional components than depicted in FIG. 11. In still other implementations, one or more functional components of device 1100 may perform one or more other tasks described as being performed by one or more other functional components of device 1100.

Figure 12A:
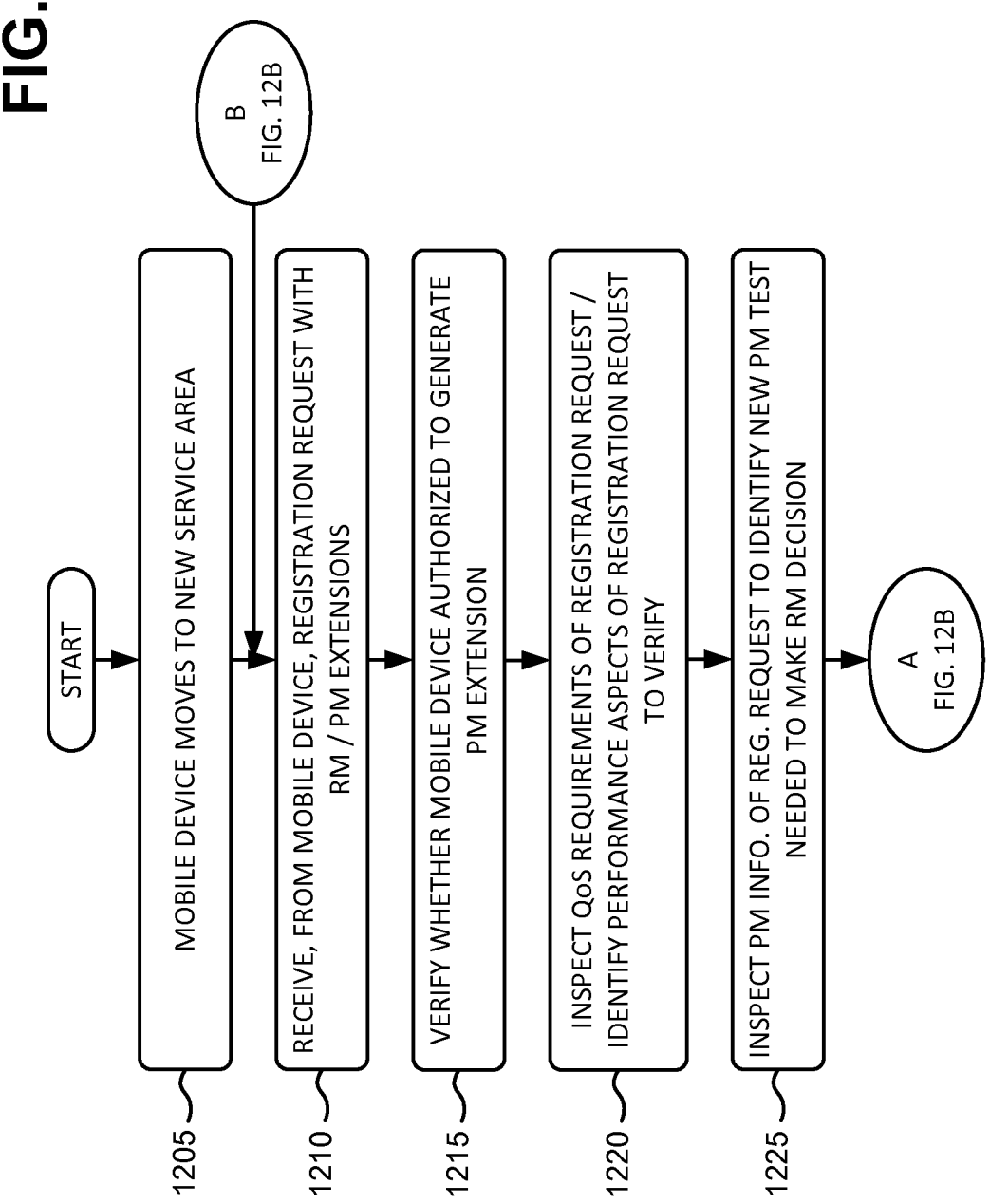
FIGS. 12A and 12B illustrate a flow chart of an exemplary process for handling a new or updated network resource request according to implementations described herein.
Figure 12B:
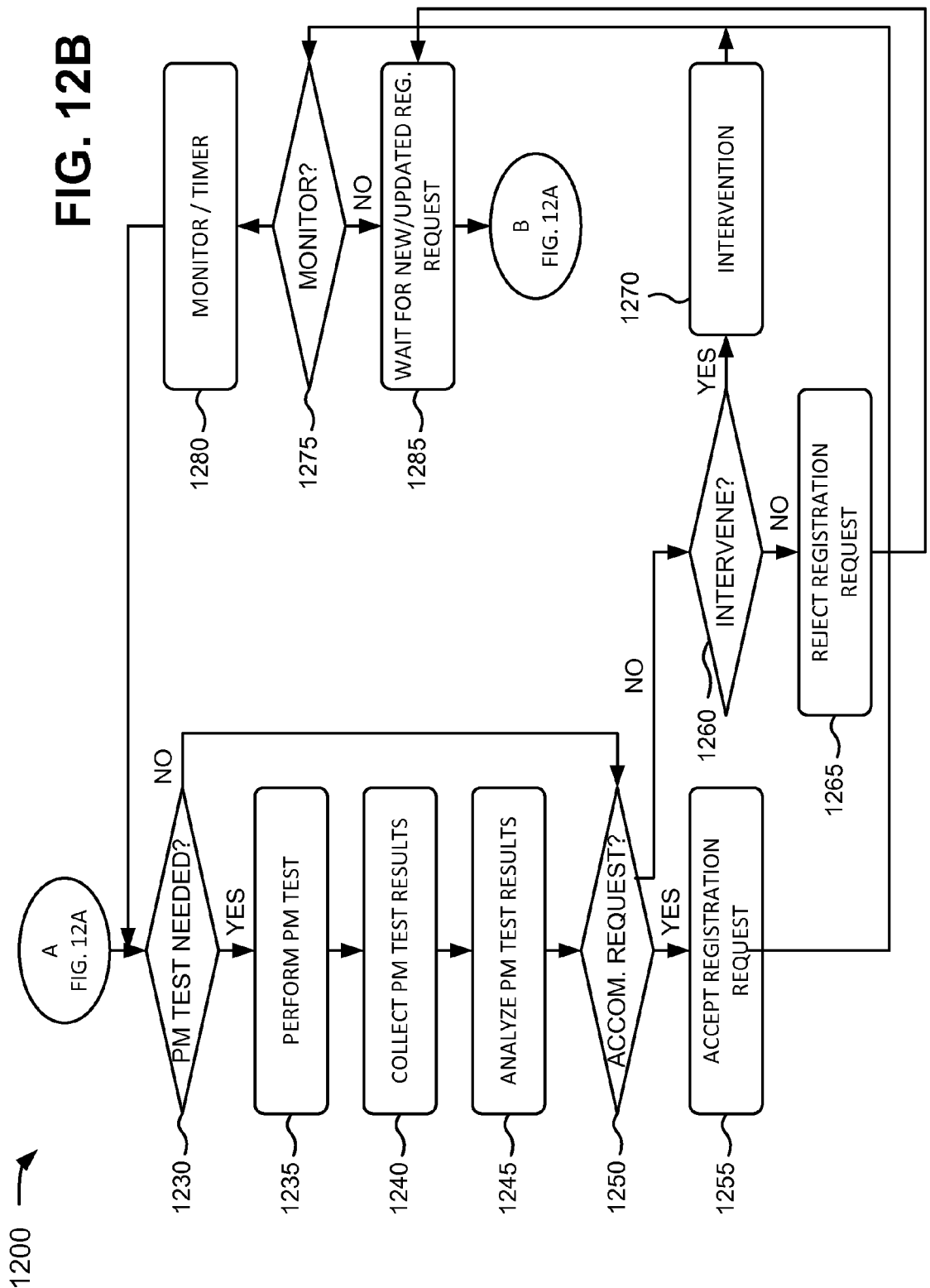

FIGS. 12A and 12B illustrate a flow chart of an exemplary process 1200 for handling a new or updated network resource request (e.g., a registration request) according to implementations described herein. In one implementation, process 1200 may be performed by one or more of FAs 140. In another implementation, some or all of process 1200 may be performed by another device or group of devices (e.g., HA 120 and/or mobile device 150), including or excluding one or more of FAs 140.

As shown in FIG. 12A, process 1200 may include a mobile device moving to a new service area (block 1205), receiving, from the mobile device, a registration request with RM and PM extensions (block 1210), and verifying whether the mobile device is authorized to generate the PM extension (block 1215). For example, in implementations described above in connection with FIG. 5, when mobile device 150 moves to a new service area, mobile device 150 may provide registration request 510 to a current FA (e.g., FA 140-3). Registration request 510 may include a local registration extension and may be extended to support both resource management (RM) and performance monitoring (PM) extensions. The RM extension of registration request 510 may support notification and processing of a requested quality of service (QoS) and corresponding functions. The PM extension of registration request 510 may support performance monitoring activities that provide feedback information for the RM process. FA 140-3 may receive registration request 510 and may verify if mobile device 150 is authorized to generate the PM extension of registration request 510.

As further shown in FIG. 12A, QoS requirements of the registration request may be inspected and performance aspects of the registration request to verify may be identified (block 1220), and PM information of the registration request may be inspected to identify a new PM test needed to make a RM decision (block 1225). For example, in implementations described above in connection with FIG. 5, if mobile device 150 is verified, it may be reflected in registration reply 520, FA 140-3 may provide registration request 510 to FA 140-1 (e.g., GFA 470). DPRM 440 and LPRM 450 (e.g., of FA 140-1 and/or FA 140-3) may inspect QoS requirements associated with registration request 510, and may identify performance monitoring (PM) aspects of registration request 510 that need to be verified, as indicated by reference number 530. DPRM 440/LPRM 450 may inspect available PM information of registration request 510 to identify if new PM test 540 is needed to make a RM decision.

As shown in FIG. 12B, it may be determined if the PM test is needed (block 1230). If the PM test is not needed (block 1230—NO), process 1200 may proceed to process block 1250 (described below). If the PM test is needed (block 1230—YES), the PM test may be performed (block 1235), PM test results may be collected (block 1240), and the PM test results may be analyzed (block 1245). For example, in implementations described above in connection with FIG. 5, if new PM test 540 is needed to make a RM decision, DPRM 440/LPRM 450 may provide new PM test 540 to PMA 420 and/or PPMA 430 (e.g., of FA 140-1 and/or FA 140-3) and/or to PMM 460 (e.g., of FA 140-1). PMA 420, PPMA 430, and/or PMM 460 may receive new PM test 540, may perform new PM test 540 (e.g., may identify involved network elements and test profiles), and may collect results 550 of performance of new PM test 540. PMA 420, PPMA 430, and/or PMM 460 may provide results 550 to LPRM 450 (and/or to DPRM 440). PMM 460 may analyze results 550, and may provide its analysis 560 to LPRM 450 (and/or to DPRM 440).

As further shown in FIG. 12B, it may be determined if the registration request can be accommodated (block 1250). If the registration request can be accommodated (block 1250—YES), the registration request may be accepted (block 1255) and process 1200 may proceed to process block 1275 (described below). For example, in implementations described above in connection with FIG. 5, LPRM 450 may receive results 550 and/or analysis 560, and may determine whether registration request 510 can be accommodated based on results 550 and/or analysis 560. Alternatively and/or additionally, if DPRM 440/LPRM 450 do not identify a new PM test to execute, LPRM 450 may determine whether registration request 510 can be accommodated based on available information (e.g., QoS requirements, PM aspects, etc. associated with registration request 510). If registration request 510 can be accommodated, FA 140-1 may accept registration request 510, as indicated by reference number 570, and may provide acceptance 570 to FA 140-3 (which, in turn, may provide acceptance 570 to mobile device 150).

Returning to FIG. 12B, if the registration request cannot be accommodated (block 1250—NO), it may be determined whether an intervention is possible (block 1260). If an intervention is not possible (block 1260—NO), the registration request may be rejected (block 1265) and process 1200 may proceed to process block 1285 (described below). If an intervention is possible (block 1260—YES), the intervention may be implemented (block 1270) and process 1200 may proceed to process block 1275. For example, in implementations described above in connection with FIG. 5, if registration request 510 cannot be accommodated, LPRM 450 may forward registration request 510 to DPRM 440 (e.g., of FA 140-1 and/or FA 140-3) to determine whether an intervention (e.g., modifying a topology and/or configuration to satisfy registration request 510) is possible. If an intervention is not possible, DPRM 440 may reject registration request 510, as indicated by reference number 570, and FA 140-1 may provide rejection 570 to FA 140-3 (which, in turn, may provide rejection 570 to mobile device 150). If an intervention is possible, FA 140-1 (e.g., DPRM 440) may implement the intervention (e.g., as indicated by reference number 580) and DPRM 440/LPRM 450 may determine if a new PM test is needed (e.g., to determine if the intervention achieved requested performance enhancements).

As further shown in FIG. 12B, it may be determined whether monitoring is necessary (block 1275). If monitoring is necessary (block 1275—YES), continuous performance monitoring may be conducted and a timer function may be implemented (block 1280). If monitoring is not necessary (block 1275—NO), process 1200 may wait for a new and/or updated registration request (block 1285) and process 1200 may return to process block 1210. For example, in implementations described above in connection with FIG. 5, FA 140-1 and/or FA 140-3 (e.g., DPRM 440 and/or LPRM 450) may verify if performance metrics are maintained as long as needed. Whether FA 140-1 accepts or rejects registration request 510, FA 140-1 and/or FA 140-3 (e.g., DPRM 440 and/or LPRM 450) may determine whether continuous performance monitoring is necessary. When continuous performance monitoring is determined to be needed, DPRM 440 and/or LPRM 450 may implement a timer function that is configured to trigger an appropriate PM test (e.g., new PM test 540) at an appropriate time. When a session is terminated, the corresponding timer function may also be terminated, and FA 140-1 and/or FA 140-3 may wait for a new and/or updated registration request (e.g., from mobile device 150).

Figure 13B:
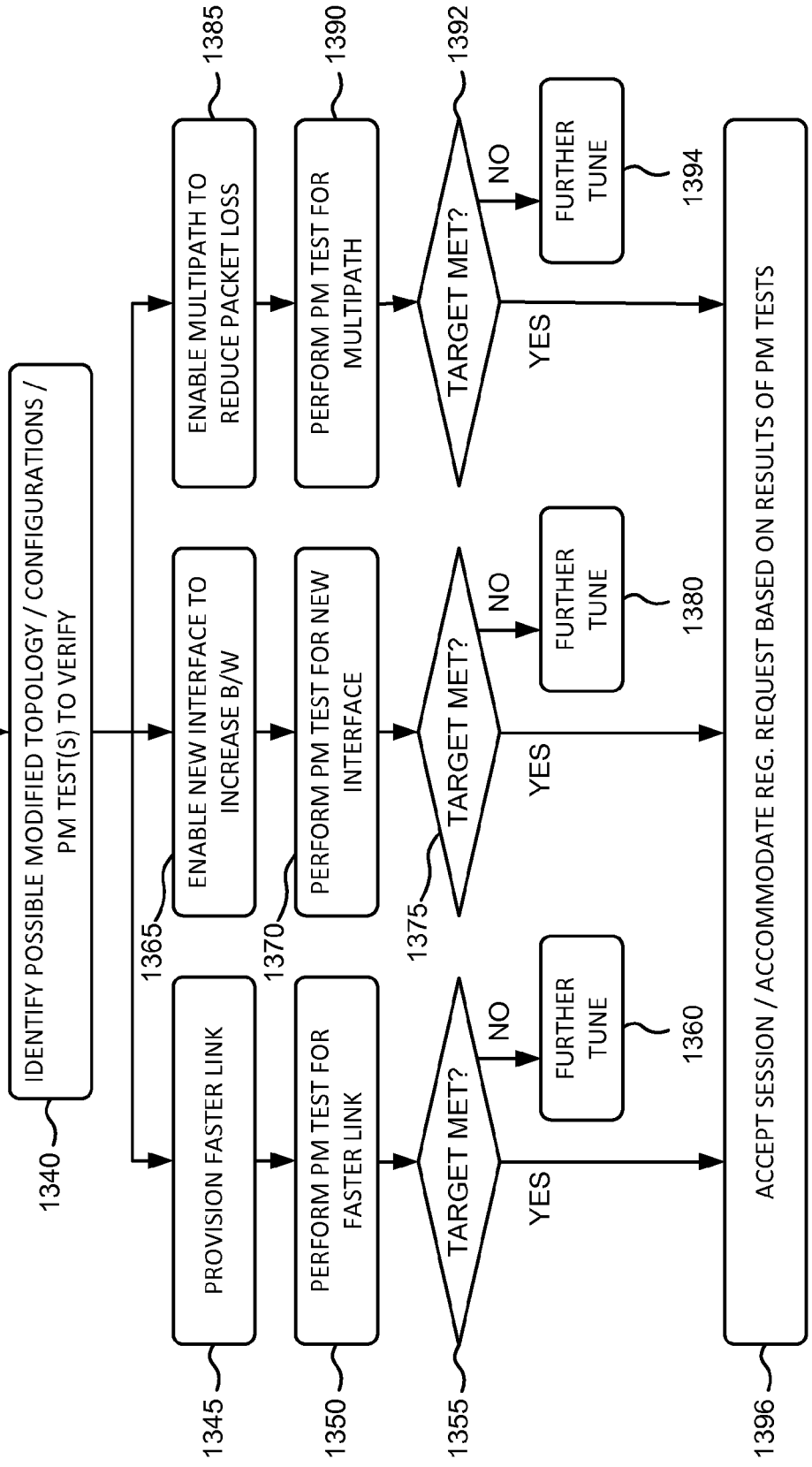

FIGS. 13A and 13B depict a flow chart of an exemplary process 1300 for optimizing network performance based on performance monitoring results according to implementations described herein. In one implementation, process 1300 may be performed by one or more of FAs 140. In another implementation, some or all of process 1300 may be performed by another device or group of devices (e.g., HA 120 and/or mobile device 150), including or excluding one or more of FAs 140.

As shown in FIG. 13A, process 1300 may include receiving a registration request from a mobile device (block 1305), comparing requirements of the registration request with a topology of a network and options of the mobile device (block 1310), and identifying performance metrics for the registration request (block 1315). For example, in implementations described above in connection with FIG. 11, requirements comparer 1110 of device 1100 may receive registration request 1140 from mobile device 150, and may compare requirements of registration request 1140 with a topology of a network (e.g., network 100) and options associated with mobile device 150. Registration request 1140 may include the features described above in connection with registration request 510. Based on the comparison, requirements comparer 1110 may identify application requirements 1150 associated with registration request 1140. Application requirements 1150 may include requirements that mobile device 150 desires to be implemented, such as a particular throughput (e.g., ten megabits per second (Mbps)), a particular maximum delay (e.g., forty milliseconds), a particular packet loss rate (e.g., less than or equal to 0.01%). Requirements comparer 1110 may provide application requirements 1150 to PM tester 1120.

As further shown in FIG. 13A, one or more PM tests may be determined to measure the performance metrics end-to-end in the network and over different links of the network (block 1320), and the one or more PM tests may be executed (block 1325). For example, in implementations described above in connection with FIG. 11, PM tester 1120 of device 1100 may receive application requirements 1150 from requirements comparer 1110, and may develop one or more PM tests to measure relevant performance metrics (e.g., throughput, delay, packet loss, etc.) end-to-end in a network (e.g., network 100) and over different links of the network. PM tester 1120 may execute the one or more PM tests to generate PM test results 1160. PM test results 1160 may include information indicating whether the relevant performance metrics (e.g., throughput, delay, packet loss, etc.) have been achieved. PM tester 1120 may provide PM test results 1160 to PM test results analyzer 1130.

Returning to FIG. 13A, the registration request may be accommodated based on results of the one or more PM tests (block 1330), or deviating performance metrics may be identified based on the results of the one or more PM tests (block 1335). For example, in implementations described above in connection with FIG. 11, PM test results analyzer 1130 of device 1100 may receive PM test results 1160 from PM tester 1120, and may analyze PM test results 1160. RM 1135 may determine actions (e.g., to perform on network 100) based on the analysis of PM test results 1160. In one example, RM 1135 may determine that registration request 1140 may be accommodated (e.g., as indicated by reference number 1170) based on the analysis of PM test results 1160. In another example, PM test results analyzer 1130 may identify deviated performance metrics 1180 (e.g., and corresponding links and/or network elements) based on the analysis of PM test results 1160, and may provide deviated performance metrics 1180 to RM 1135. Deviated performance metrics 1180 may include deviations from performance metrics (e.g., throughput, delay, packet loss, etc.), such as a throughput of five Mbps (rather than ten Mbps), a delay of sixty milliseconds (rather than forty milliseconds), and/or packet loss rate of greater than 0.01% (rather than less than or equal to 0.01%).

As shown in FIG. 13B, possible modified topology/configurations of the network and one or more PM tests to verify the possible modified topology/configurations may be identified (block 1340), a faster link in the network may be provisioned (block 1345), a PM test for the faster link may be performed (block 1350), and whether a target metric is achieved may be determined (block 1355). If the target metric is achieved (block 1355—YES), process 1300 may proceed to block 1396 (described below). Otherwise (block 1355—NO), the provisioning of the faster link may be further tuned (block 1360). For example, in implementations described above in connection with FIGS. 10B and 11, RM 1135 may receive deviated performance metrics 1180, may identify possible modified topology and/or configurations of the network (e.g., based on deviated performance metrics 1180), and may determine one or more PM tests to verify the modified topology/configurations of the network. In one example, RM 1135 may identify provisioning of a faster link (e.g., link 1030) between FA 140-3 and FA 140-5 (e.g., with a target delay of ten milliseconds) as a possible modification, and PM tester 1120 may execute a PM test for the provisioning of such a faster link. Results of the PM test for the faster link may be provided from PM tester 1120 to PM test results analyzer 1130, and PM test results analyzer 1130 may determine if a target metric (e.g., a target delay of ten milliseconds) is achieved. If the target metric is not achieved, RM 1135 may further tune the provisioning of such a faster link until the target metric is achieved.

As further shown in FIG. 13B, a new interface to increase bandwidth may be enabled (block 1365), a PM test for the new interface may be performed (block 1370), and whether a target metric is achieved may be determined (block 1375). If the target metric is achieved (block 1375—YES), process 1300 may proceed to block 1396 (described below). Otherwise (block 1375—NO), the enabling of the new interface may be further tuned (block 1380). For example, in implementations described above in connection with FIGS. 10B and 11, RM 1135 may identify enabling a second interface (e.g., interface 1020) between mobile device 150 and FA 140-5 (e.g., with a target bandwidth of ten Mbps) as a possible modification, and PM tester 1120 may execute a PM test for the enabling of the second interface. Results of the PM test for the second interface may be provided from PM tester 1120 to PM test results analyzer 1130, and PM test results analyzer 1130 may determine if a target metric (e.g., a target bandwidth of ten Mbps) is achieved. If the target metric is not achieved, RM 1135 may further tune the configuration by enabling additional interfaces or tuning existing ones until the target metric is achieved.

Returning to FIG. 13B, a multipath to reduce packet loss rate may be enabled (block 1385), a PM test for the multipath may be performed (block 1390), and whether a target metric is achieved may be determined (block 1392). If the target metric is achieved (block 1392—YES), process 1300 may proceed to block 1396 (described below). Otherwise (block 1392—NO), the enabling of the multipath may be further tuned (block 1394). For example, in implementations described above in connection with FIGS. 10B and 11, RM 1135 may identify enabling a multipath (e.g., via second base station 810) between mobile device 150 and FA 140-5 (e.g., with a target of reduced packet loss rate) as a possible modification, and PM tester 1120 may execute a PM test for the enabling of the multipath. Results of the PM test for the multipath may be provided from PM tester 1120 to PM test results analyzer 1130, and PM test results analyzer 1130 may determine if a target metric (e.g., a reduced packet loss rate) is achieved. If the target metric is not achieved, RM 1135 may further tune the enabling of the multipath until the target metric is achieved.

As further shown in FIG. 13B, a session may be accepted and the registration request may be accommodated based on the results of the one or more PM tests (block 1396). For example, in implementations described above in connection with FIG. 11, if target metrics are achieved (e.g., as indicated by reference number 1190), RM 1135 may accommodate registration request 1140 (e.g., as indicate by reference number 1170). A network portion may then be modified based on the accommodation of registration request 1140.

Implementations described herein may provide systems and/or methods that may manage network resources and policies based on monitored performance aspects in a network that supports mobile devices. The systems and/or methods may collect and/or analyze performance metrics of different aspects over different segments of the network. The systems and/or methods may use the resulting analysis to support a network resource management system. The systems and/or method may react to mobility- and/or capacity-related network events while actively evaluating and monitoring relevant network performance aspects. The systems and/or methods may integrate both performance monitoring and resource management in a manner that optimizes network utilization and service availability. The integrated performance monitoring and resource management functions may provide a more accurate network resource manager that is efficient for a mobile environment.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 12A-13B, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a processor, a connection request to establish a connection between a client device and a network during a time period, wherein the network is associated with a plurality of interfaces;
    identifying, by the processor and based on the connection request, a desired quantity of interfaces, of the plurality of interfaces, to include in the connection;
    determining, by the processor, whether the desired quantity of interfaces will be available via the network during the time period; and
    processing, by the processor, the connection request based on determining whether the desired quantity of interfaces will be available during the time period, wherein processing the connection request includes:
        establishing the connection via the desired quantity of interfaces based on determining that the desired quantity of interfaces will be available during the time period, and
        rejecting the connection request based on determining that the desired quantity of interfaces will be not available during the time period.

2. The method of claim 1, wherein identifying the desired quantity of interfaces further includes:
    determining a resource requirement associated with the connection request;
    determining respective resource levels available via the plurality of the interfaces; and
    identifying the desired quantity of interfaces based on the resource requirement and the respective resource levels, wherein a total resource level available via the desired quantity of interfaces achieves the resource requirement.

3. The method of claim 2, wherein the resource requirement includes a desired bandwidth, the respective resource levels correspond to respective bandwidths available via the plurality of interfaces, and the total resource level corresponds to a total bandwidth available via the desired quantity of interfaces.

4. The method of claim 2, wherein determining the resource requirement associated with the connection request further includes:
    identifying a type of data to be transmitted via the connection, wherein the type of data is associated with a desired performance metric; and
    identifying the resource requirement based on the desired performance metric, wherein the desired performance metric is achieved when transmitting the type of data via the desired quantity of interfaces.

5. The method of claim 2, wherein determining the respective resource levels available via the plurality of the interfaces further includes:
    performing a performance test to evaluate the plurality of interfaces; and
    determining the respective resource levels available via the plurality of the interfaces based on performing the performance test.

6. The method of claim 2, wherein the plurality of the interfaces are associated with wireless transmissions, and wherein determining the respective resource levels available via the plurality of the interfaces further includes:
    identifying a topology associated with the client device and the network;
    determining an effect of the topology on the wireless transmissions; and
    determining the respective resource levels available via the plurality of the interfaces based on the effect of the topology on the wireless transmissions.

7. The method of claim 1, wherein the network is a wireless network, and the connection request relates to establishing the connection between the client device and a base station associated with the wireless network, and
wherein determining whether the desired quantity of interfaces will be available during the time period further includes determining whether the desired quantity of interfaces will be available via the base station during the time period.

8. The method of claim 7, wherein the base station is a first base station, and wherein processing the connection request based on whether the desired quantity of interfaces will be available further includes:
determining, based on the determining that the desired quantity of interfaces will be unavailable via the first base station during the time period, whether the desired quantity of interfaces will be available via a second base station during the time period; and
establishing the connection between the client device and the second based station based on determining that the desired quantity of interfaces will be available via a second base station during the time period.

9. The method of claim 1, further comprising:
verifying whether the client device is authorized to generate the connection request, wherein the desired quantity of interfaces are identified based on determining that the client device is authorized to generate the connection request.

10. The method of claim 1, wherein identifying the desired quantity of interfaces to include in the connection further includes:
parsing the connection request to determine connection information that identifies one or more of:
a resource request identification,
a requesting entity,
a requested allocation type,
a requested resource direction,
a resource allocation end-point,
an address of the end-point,
a requested resource upstream,
a requested resource downstream,
a resource marking upstream,
a resource marking downstream,
a resource requested duration, or
an allocation request mode; and
identifying the desired quantity of interfaces based on the connection information.

11. The method of claim 1, wherein processing the connection request further includes:
determining, based on determining that the desired quantity of interfaces will be unavailable via the network during the time period, whether the network can be modified to provide the desired quantity of interfaces during the time period;
modifying the network to be modified to provide the desired quantity of interfaces when the network can be modified; and
establishing the connection via the desired quantity of interfaces through the modified network.

12. The method of claim 1, wherein the desired quantity of interfaces includes a first quantity of interfaces, and wherein the method further comprises:
monitoring the established connection to determine monitoring data associated with the established connection;
comparing the monitoring data and a performance metric associated with desired performance;
determining, based on comparing the monitoring data and the performance metric, a second quantity of interfaces for achieving the performance metric; and
modifying the established connection to include the second quantity of interfaces.

13. A device comprising:
a memory configured to store information identifying one or more interfaces, of a plurality of interfaces associated with a network, that will be available during a time period; and
a processor configured to:
receive a connection request to establish a connection between a client device and the network during a time period,
identify, based on the connection request, a desired quantity of interfaces, of the plurality of interfaces, to include in the connection,
determine whether the desired quantity of interfaces are included in the one or more interfaces that will be available during the time period,
establish the connection via the desired quantity of interfaces when the desired quantity of interfaces are included in the one or more interfaces, and
reject the connection request when the desired quantity of interfaces are not included in the available one or more interfaces.

14. The device of claim 13, where the device includes one or more of:
a home agent device associated with the network,
a foreign agent device associated with the network,
a gateway,
a router,
a switch,
a firewall,
a network interface card (NIC),
a hub,
a bridge, or
a proxy server.

15. The device of claim 13, wherein the processor, when identifying the desired quantity of interfaces, is further configured to:
identify a resource requirement associated with the connection request,
determine respective resource levels available via the plurality of the interfaces, and
determine the desired quantity of interfaces based on the resource requirement and the respective resource levels, wherein a total resource level available via the desired quantity of interfaces achieves the resource requirement.

16. The device of claim 15, wherein the processor, when identifying the resource requirement associated with the connection request, is further configured to:
identify a type of data to be transmitted via the connection, wherein the type of data is associated with a desired performance metric, and
identify the resource requirement based on the desired performance metric, wherein the desired performance metric is achieved when transmitting the type of data via the connection via the desired quantity of interfaces.

17. A non-transitory computer-readable medium to store instructions comprising:
one or more instructions that, when executed by a processor, cause the processor to:
receive a connection request to establish a connection between a client device and a network during a time period, wherein the network is associated with a plurality of interfaces;
identify, based on the connection request, a desired quantity of interfaces, of the plurality of interfaces, to include in the connection;

determine whether the desired quantity of interfaces will be available via the network during the time period; and establish the connection via the desired quantity of interfaces when the desired quantity of interfaces will be available during the time period.

18. The non-transitory computer-readable medium of claim 17, wherein the one or more instructions to determine the desired quantity of interfaces based further cause the processor to:

perform a performance test to evaluate the plurality of interfaces;

determine respective resource levels available via the plurality of the interfaces based on performing the performance test;

identify a resource requirement associated with the connection request; and determine the desired quantity of interfaces based on the resource requirement and the respective resource levels, wherein a total resource level available via the desired quantity of interfaces achieves the resource requirement.

19. The non-transitory computer-readable medium of claim 18, wherein the plurality of the interfaces are associated with wireless transmissions, and wherein the one or more instructions to determine respective resource levels available via the plurality of the interfaces further cause the processor to:

identify a topology associated with the client device and the network;

determine an effect of the topology on the wireless transmissions; and determine the respective resource levels available via the plurality of the interfaces based on the effect of the topology on the wireless transmissions.

20. The non-transitory computer-readable medium of claim 17, wherein the instructions further comprise:

one or more instructions that, when executed by the processor, cause the processor to identify a particular interface, of the plurality of interfaces, associated with the connection request, wherein the one or more instructions to determine whether the desired quantity of interfaces further cause the processor to determine whether the particular interface is available during the time period, and wherein the one or more instructions to establish the connection via the desired quantity of interfaces further cause the processor to include particular interface in the connection when the particular interface and the desired quantity of interfaces will be available during the time period.

* * * * *